(12) United States Patent
Awad et al.

(10) Patent No.: US 9,661,624 B2
(45) Date of Patent: May 23, 2017

(54) RESOURCE ALLOCATION SIGNALLING

(71) Applicant: NEC Corporation, Minato-ku, Tokyo (JP)

(72) Inventors: Yassin Aden Awad, Tokyo (JP); Caroline Liang, Tokyo (JP); Kay Seo, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 14/417,861

(22) PCT Filed: Jul. 2, 2013

(86) PCT No.: PCT/JP2013/068573
§ 371 (c)(1),
(2) Date: Jan. 28, 2015

(87) PCT Pub. No.: WO2014/021058
PCT Pub. Date: Feb. 6, 2014

(65) Prior Publication Data
US 2015/0208387 A1    Jul. 23, 2015

(30) Foreign Application Priority Data

Aug. 2, 2012 (GB) .................................. 1213794.9

(51) Int. Cl.
*H04W 72/04* (2009.01)
(52) U.S. Cl.
CPC ................................. *H04W 72/042* (2013.01)
(58) Field of Classification Search
CPC ................................................. H04W 72/042

USPC ......................................................... 370/329
See application file for complete search history.

(56) References Cited

U.S. PATENT DOCUMENTS

| | | | |
|---|---|---|---|
| 8,155,062 B2 * | 4/2012 | Jung | H04W 72/042 370/329 |
| 8,432,870 B2 * | 4/2013 | Maheshwari | H04W 36/0055 370/331 |
| 8,462,740 B2 * | 6/2013 | Kwak | H04W 28/06 370/336 |
| 2008/0013599 A1 * | 1/2008 | Malladi | H04L 5/0007 375/132 |

(Continued)

FOREIGN PATENT DOCUMENTS

| | | |
|---|---|---|
| CN | 102378366 A | 3/2012 |
| WO | 2011/085192 A1 | 7/2011 |
| WO | 2011/129610 A | 10/2011 |
| WO | 2012/065727 A1 | 5/2012 |

OTHER PUBLICATIONS

Japanese Office Action for JP Application No. 2015-506008 mailed on Feb. 3, 2016 with English Translation.

(Continued)

*Primary Examiner* — Stephen J Clawson

(57) ABSTRACT

A mobile telecommunications system is described in which a base station uses enhanced allocation techniques to reduce fragmentation of resource allocations within a sub-frame due to the presence of control data within resources used for carrying user data. Different solutions are described including provision of supplemental information to supplement existing resource allocation data, use of overloading such that DCI formats may have different interpretations and the provision of new DCI formats.

12 Claims, 12 Drawing Sheets

(56) References Cited

U.S. PATENT DOCUMENTS

| | | | | |
|---|---|---|---|---|
| 2008/0285513 | A1* | 11/2008 | Jung | H04W 72/042 370/329 |
| 2009/0028260 | A1* | 1/2009 | Xiao | H04L 1/0026 375/260 |
| 2010/0008315 | A1* | 1/2010 | Palanki | H04W 72/082 370/329 |
| 2010/0284348 | A1* | 11/2010 | Kashima | H04W 72/042 370/329 |
| 2011/0249633 | A1* | 10/2011 | Hong | H04L 5/0053 370/329 |
| 2013/0039284 | A1* | 2/2013 | Marinier | H04L 5/001 370/329 |
| 2013/0044664 | A1* | 2/2013 | Nory | H04L 1/0045 370/311 |
| 2013/0064099 | A1* | 3/2013 | Kim | H04L 5/0053 370/241 |
| 2013/0188566 | A1* | 7/2013 | Zhu | H04W 72/042 370/329 |
| 2013/0230015 | A1* | 9/2013 | Hoymann | H04L 5/0053 370/329 |
| 2015/0063231 | A1* | 3/2015 | Seo | H04L 5/0044 370/329 |

OTHER PUBLICATIONS

NEC Group, PDSCH Resource Allocation in presence of ePDCCH, 3GPP TSG RAN WG1 Meeting #70 R1-123251, Aug. 5, 2012.

3rd Generation Partnership Project, "Technical Specification Group Radio Access Network; Evolved Universal Terrestrial Radio Access (E-UTRA); Physical layer procedures (Release 10)", 3GPP TS 36.213 (V10.6.0), Jun. 2012.

Nokia et al, "Signaling ePDCCH presence using demodulation", 3rd Generation Partnership Project, 3GPP TSG RAN WG1 Meeting #68bis Jeju, Korea, R1-121286, Mar. 26-30, 2012.

Ericsson et al, "On enhanced PDCCH design", 3rd Generation Partnership Project, 3GPP TSG RAN WG1 Meeting #68bis, Zhuhai, China, R1-112928, Oct. 10-14, 2011.

Nokia et al., "On the reuse of ePDCCH resources", 3rd Generation Partnership Project, 3GPP TSG RAN WG1 Meeting #68bis Prague, Czech Republic, R1-122607, May 21-25, 2012.

Panasonic, "Type 0 and type 2 PDSCH assignment on resources", 3rd Generation Partnership Project, 3GPP TSG RAN WG1 Meeting #68 Prague, Czech Republic, R1-122205, May 21-25, 2012.

International Search Report for PCT Application No. PCT/JP2013/068573, mailed on Mar. 11, 2014.

* cited by examiner

RESOURCE ALLOCATION SIGNALLING

This application is a National Stage Entry of PCT/JP2013/068573 filed on Jul. 2, 2013, which claims priority from British Patent Application GB1213794.9 filed on Aug. 2, 2012, the contents of all of which are incorporated herein by reference, in their entirety.

TECHNICAL FIELD

The present invention relates to control signalling for the allocation of resources within a communication system. The invention has particular, although not exclusive relevance to the efficient allocation of resources used to signal the allocation of physical resource blocks (PRBs) for downlink and/or uplink user data communications in a Long Term Evolution (LTE) of UTRAN (UMTS Terrestrial Radio Access Network) system.

BACKGROUND ART

In an LTE communication system, in order for a user device to transmit and receive data over the air interface, the user device needs to be allocated physical radio resources, and the user device must be notified of its resource assignments by means of control signalling. In LTE, the physical downlink control channel (PDCCH) carries scheduling assignments and other control information, and the PDCCH resources used to signal scheduling assignments to users in the cell are dynamically allocated by the serving base station.

A PDCCH consists of an aggregation of one or more consecutive control channel elements (CCEs), where a CCE occupies a fraction of the base station cell's available physical radio resources. The total number of CCEs available in a cell depends on the system bandwidth of the cell and the number of OFDM symbols reserved for PDCCH transmission in a given sub-frame. Typically, the first three symbols of a sub-frame are reserved for the PDCCH. With LTE Release 11 and beyond additional control channel information can be included using radio resources usually assigned for the Physical Downlink Shared Channel (PDSCH). One example of such additional control channel information is called the enhanced PDCCH (ePDCCH). However, the provision of an ePDCCH in the PDSCH causes problems for the efficient allocation of resources within the PDSCH (as it results in the fragmentation of resources that are allocated) and additional resource allocation techniques are required to address these inefficiencies.

DISCLOSURE OF INVENTION

According to one aspect, the present invention provides a communication node that communicates with a user device over a wireless interface, the communication node comprising: transceiver circuitry that transmits signals to and receives signals from the user device using a sequence of sub-frames, each sub-frame comprising a plurality of communication resource blocks, each resource block corresponding to a sub-band of a system bandwidth used by the communication node to communicate with the user device and each resource block having a control portion for carrying first control data and a data portion for carrying user data; and a resource allocation module arranged to allocate, within a sub-frame, resource blocks for communicating with the user device; wherein the resource allocation module is arranged: i) to generate first resource allocation data for transmission to the user device, which first resource allocation data allocates a first plurality of the resource blocks for use in communicating user data with the user device; ii) to allocate at least one resource block for carrying second control data for the user device within the data portion of the at least one resource block, which at least one resource block is included within said first plurality of resource blocks allocated by said first resource allocation data; and iii) to generate second resource allocation data for transmission to the user device that the user device can use to exclude the at least one resource block carrying said second control data from the first plurality of resource blocks allocated by said first allocation data.

The second resource allocation data in combination with the first resource allocation data may identify the at least one resource block that carries the second control data.

The second resource allocation data may identify the at least one resource block for carrying second control data relative to the first plurality of resource blocks allocated by said first resource allocation data.

The plurality of resource blocks of a sub-frame may be arranged in a sequence of resource block groups and the first resource allocation data may allocate the resource blocks within a selected one or more of said resource block groups. In this case, the second resource allocation data may comprise a bitmap, wherein the bits within the bitmap correspond to resource blocks within the selected one or more resource block groups and identify said at least one resource block for carrying said second control data.

The first allocation data may comprises at least one of: i) a bit map identifying the first plurality of allocated resource blocks, and ii) data identifying a starting resource block and a number of resource blocks from the starting resource block that are allocated.

The at least one resource block may be allocated within a known subset of the resource blocks and the second resource allocation data may identify the at least one resource block with reference to the known subset.

Means, such as the transceiver circuitry, may be provided for transmitting third control data to the user device that identifies the subset of resource blocks. This means for transmitting may transmit the third control data in advance of the communication node transmitting the sub-frame or it may transmit the third control data within the sub-frame. The known subset of resource blocks may be fixed or it may change from sub-frame to sub-frame.

In an alternative embodiment, the at least one resource block is allocated within one of a plurality of predefined subsets of resource blocks and the second resource allocation data identifies one or more of the predefined subsets of resource blocks containing second control data for exclusion from said plurality of resource blocks allocated by said first allocation data. In this case, each predefined subset of resource blocks may have an associated index value and the second control data identifies the index value associated with the one or more of the predefined subsets of resource blocks containing second control data.

Typically, the communication node will communicate with a plurality of user devices using the resource bocks in a sub-frame and will transmit respective second control data to each user device individually or collectively. If the second control data is transmitted individually to each user device, then different second control data can be transmitted to each user device. In this case, the resource allocation module may generate respective first allocation data for first and second user devices that define overlapping resource blocks that are allocated for the first and second user devices and the resource allocation module may generate different second control data for the first and second user devices to cause each user device to exclude resource blocks to remove the overlap.

The first and second allocation data may be transmitted within an enhanced Physical Downlink Control Channel, ePDCCH.

The resource allocation module may allocate physical resource blocks or virtual resource blocks.

The invention also provides a user device for communicating with a communication node, the user device comprising: transceiver circuitry that transmits signals to and receives signals from the communication node using a sequence of sub-frames, each sub-frame comprising a plurality of communication resource blocks, each resource block corresponding to a sub-band of a system bandwidth of the communication node and each resource block having a control portion for carrying first control data and a data portion for carrying user data; and a communication control module that is arranged: i) to receive first resource allocation data, which first resource allocation data allocates a first plurality of the resource blocks for use in communicating user data with the communication node; ii) to receive at least one resource block that carries second control data for the user device within the data portion of the at least one resource block, which at least one resource block is included within said first plurality of resource blocks allocated by said first resource allocation data; iii) to receive second resource allocation data relating to the at least one resource block carrying said second control data; and iv) to exclude the at least one resource block carrying said second control data from the first plurality of resource blocks allocated by said first allocation data.

The communication control module may be arranged to use the second resource allocation data in combination with the first resource allocation data to identify the at least one resource block that carries the second control data.

The second resource allocation data may identify the at least one resource block that carries the second control data relative to the first plurality of resource blocks allocated by said first resource allocation data.

The plurality of resource blocks of a sub-frame may be arranged in a sequence of resource block groups and the first resource allocation data may allocate the resource blocks within a selected one or more of said resource block groups. In this case, the second resource allocation data may comprise a bitmap, wherein the bits within the bitmap correspond to resource blocks within the selected one or more resource block groups and identify said at least one resource block for carrying said second control data.

The first allocation data may allocate said first plurality of resource blocks as a contiguous group of resource blocks, although this is not essential.

The first allocation data may comprises at least one of: i) a bit map identifying the first plurality of allocated resource blocks, and ii) data identifying a starting resource block and a number of resource blocks from the starting resource block that are allocated.

The at least one resource block may be allocated within a predefined subset of the resource blocks and the second resource allocation data may identifies the at least one resource block with reference to the predefined subset. In this case, means for receiving third control data that identifies the predefined subset of resource blocks may be provided. This means for receiving may be arranged to receive the third control data in advance of the user device receiving the sub-frame or it may receive the third control data within the sub-frame.

The predefined subset of resource blocks may be static or it may change from sub-frame to sub-frame.

In an alternative embodiment, the at least one resource block may be allocated within one of a plurality of predefined subsets of resource blocks and the second resource allocation data identifies one or more of the predefined subsets of resource blocks containing second control data and the communication control module is arranged to exclude the resource blocks within the identified predefined subsets from the plurality of resource blocks allocated by the first allocation data. In this case, each predefined subset of resource blocks may have an associated index value and the second control data identifies the index value associated with the one or more of the predefined subsets of resource blocks containing second control data.

The first and second allocation data may be transmitted within an enhanced Physical Downlink Control Channel, ePDCCH.

The invention also provides a method performed within a communication node that communicates with a user device over a wireless interface, the method comprising: transmitting signals to and receiving signals from the user device using a sequence of sub-frames, each sub-frame comprising a plurality of communication resource blocks, each resource block corresponding to a sub-band of a system bandwidth used by the communication node to communicate with the user device and each resource block having a control portion for carrying first control data and a data portion for carrying user data; and allocating, within a sub-frame, resource blocks for communicating with the user device; wherein the allocating step comprises: i) generating first resource allocation data for transmission to the user device, which first resource allocation data allocates a first plurality of the resource blocks for use in communicating user data with the user device; ii) allocating at least one resource block for carrying second control data for the user device within the data portion of the at least one resource block, which at least one resource block is included within said first plurality of resource blocks allocated by said first resource allocation data; and iii) generating second resource allocation data for transmission to the user device that the user device can use to exclude the at least one resource block carrying said second control data from the first plurality of resource blocks allocated by said first allocation data.

The invention also provides a method performed by a user device that communicates with a communication node, the method comprising: transmitting signals to and receiving signals from the communication node using a sequence of sub-frames, each sub-frame comprising a plurality of communication resource blocks, each resource block corresponding to a sub-band of a system bandwidth used by the user device to communicate with the communication node and each resource block having a control portion for carrying first control data and a data portion for carrying user data; and controlling the communication, including: i) receiving first resource allocation data, which first resource allocation data allocates a first plurality of the resource blocks for use in communicating user data with the communication node; ii) receiving at least one resource block that carries second control data for the user device within the data portion of the at least one resource block, which at least one resource block is included within said first plurality of resource blocks allocated by said first resource allocation data; iii) receiving second resource allocation data relating to the at least one resource block carrying said second control data; and iv) excluding the at least one resource block carrying said second control data from the first plurality of resource blocks allocated by said first allocation data.

According to another aspect, the invention also provides a communication node that communicates with a user device over a wireless interface, the communication node comprising: transceiver circuitry that transmits signals to and receives signals from the user device using a sequence of sub-frames, each sub-frame comprising a plurality of communication resource blocks, each resource block corresponding to a sub-band of a system bandwidth used by the communication node to communicate with the user device; a communications control module for controlling communications with the user device and arranged to send control data to the user device in one of a plurality of predefined control data formats, the control data formats including a plurality of legacy control data formats each comprising a different number of bits and one or more new control data formats that each have the same number of bits as a legacy control data format; and a resource allocation module arranged to generate resource allocation data that allocates, within a sub-frame, resource blocks for communicating with the user device; wherein the communications control module is arranged to include the resource allocation data within a selected one of the predefined control data formats and in the case that the resource allocation data has been included within a control data format that has the same number of bits as another control data format, is arranged to signal additional control data to the user device to indicate which control data format has been signalled.

The communication control module may be arranged to signal the additional control data to the user device within the control data format or within another different control data format.

The resource allocation data of a first legacy control data format may include:
a field that is used to indicate a selected resource block group subset from among a plurality of resource block group subsets; and
a field that includes a bitmap, where each bit of the bitmap addresses a single resource block in the selected resource block group subset.

The resource allocation data of a first new control data format may have the same number of bits as the first legacy control data format and may include:
a field that is used to indicate a selection of one out of K partitions of a system bandwidth of the communication node, where each bandwidth part contains contiguous resource blocks; and
a field that includes a bitmap, where each bit of the bitmap addresses a single resource block in the selected bandwidth part and indicates if the addressed resource block is allocated to the user device.

Alternatively, the resource allocation data of a first legacy control data format includes:
a field that is used to indicate a selected resource block group subset from among a plurality of resource block group subsets; and
a field that includes a bitmap, where each bit of the bitmap addresses a single resource block in the selected resource block group subset.

The resource allocation data of a first new control data format has the same number of bits as the first legacy control data format and includes:

a field that is used to indicate a starting resource block of a partition of resource blocks within a system bandwidth of the communication node; and
a field that includes a bitmap, where each bit of the bitmap addresses a single resource block in the partition of resource blocks and indicates if the resource block is allocated to the user device.

In this case, the field used to indicate a starting resource block of the first new control data format may comprise $\lfloor \log_2(N_{RB}) \rfloor$ bits and the field of the first new control data field that includes the bitmap may comprise $\lceil N_{RB}/P \rceil - \lceil \log_2(N_{RB}) \rceil$ bits, where NRB is the number of available resource blocks and P defines the number of resource blocks within each subset.

Alternatively, the field used to indicate a starting resource block of the first new control data format may comprise $\lfloor \log_2(N_{RB}) \rfloor$ bits and the field of the first new control data field that includes the bitmap may comprise $\lceil N_{RB}/P \rceil$ bits, where NRB is the number of available resource blocks and P defines the number of resource blocks within each subset.

The first legacy control data format and the first new control data format may further include a field that indicates if the control data field is the first legacy control data format or the first new control data format.

This aspect of the invention also provides a user device that communicates with a communication node over a wireless interface, the user device comprising: transceiver circuitry that transmits signals to and receives signals from the communication node using a sequence of sub-frames, each sub-frame comprising a plurality of communication resource blocks, each resource block corresponding to a sub-band of a system bandwidth of the communication node; a communications control module for controlling communications with the communication node and operable: i) to receive control data from the communication node in one of a plurality of predefined control data formats, the control data formats including a plurality of legacy control data formats each comprising a different number of bits and one or more new control data formats that each have the same number of bits as a legacy control data format, the received control data comprising resource allocation data that allocates, within a sub-frame, resource blocks for communicating with the communication node; ii) in the case that the received control data is in a control data format that has the same number of bits as another control data format, to receive additional control data that indicates which control data format has been used; and a control data interpreter module that interprets the received control data format in accordance with the legacy control data format or in accordance with the new control data format in dependence upon the received additional control data.

The communication control module may be arranged to receive the additional control data within the control data format.

Alternatively, the communication control module may be arranged to receive the additional control data within another different control data format.

The invention also provides, for all methods disclosed, corresponding computer programs or computer program products for execution on corresponding user communications devices or network communications devices. The invention also provides user communications devices and network communications devices configured or operable to implement the methods and components thereof and methods of updating these.

BRIEF DESCRIPTION OF DRAWINGS

These and various other aspects of the invention will become apparent, from the following detailed description of embodiments which are given by way of example only and which are described with reference to the accompanying drawings in which.

DETAILED DESCRIPTION OF EXEMPLARY EMBODIMENTS

Overview

Figure 1:
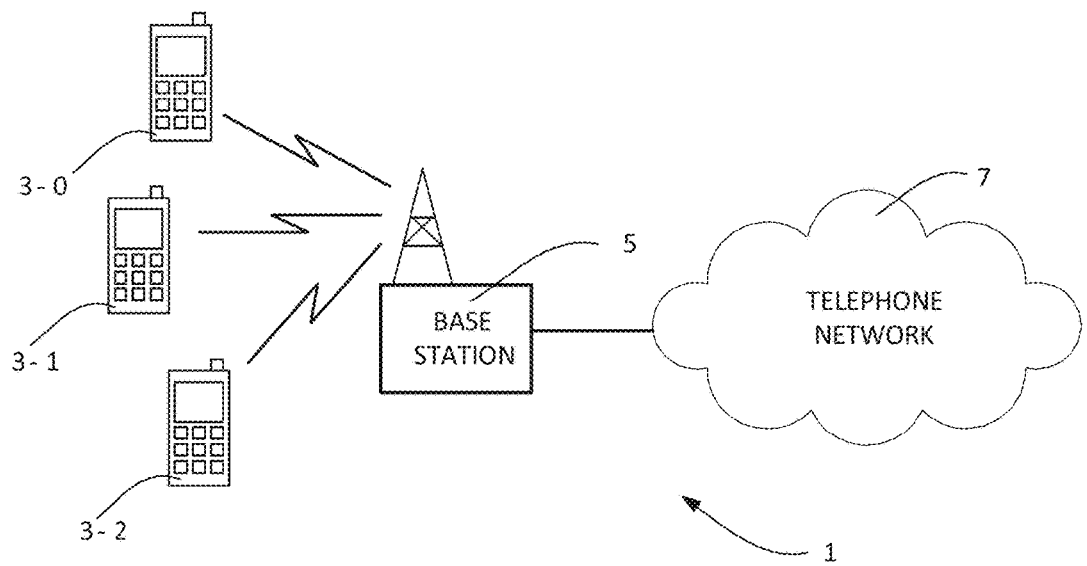
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones 3-0, 3-1, and 3-2 can communicate with other users (not shown) via a base station 5 and a telephone network 7. In this embodiment, the base station 5 uses an orthogonal frequency division multiple access (OFDMA) technique for transmitting the downlink data to the mobile telephones 3; and the mobile telephones 3 use a single carrier frequency division multiple access (FDMA) technique to transmit their uplink data to the base station 5. In order that a mobile telephone 3 can transmit and receive data over the air interface, the mobile telephone 3 needs to be allocated physical resource blocks (by the base station 5), and the mobile telephone 3 must be notified of its resource assignments by means of control signalling within, in the case of LTE, the Physical Downlink Control Channel (PDCCH).

LTE Sub-Frame Data Structure

Before discussing the specific ways in which the base station 5 allocates resources to the mobile telephones 3, a description will be given of the general frame structure agreed for LTE Release 8 (Rel 8) and beyond and therefore what these resources represent. As mentioned above, an OFDMA technique is used for the downlink to allow the base station 5 to transmit user data over the air interface to the respective mobile telephones 3; and an SC-FDMA technique is used for the uplink to allow the mobile telephones 3 to transmit their data over the air interface to the base station 5. Different sub-carriers are allocated by the base station 5 (for a predetermined amount of time) to each mobile telephone 3 depending on the amount of data to be sent in each direction. These sub-carriers and temporal allocations are defined as physical resource blocks (PRBs) in the LTE specifications. PRBs thus have a time and frequency dimension. The base station 5 dynamically allocates PRBs for each device that it is serving and signals the allocations for each sub-frame to each of the scheduled mobile telephones 3 over the PDCCH.

Figure 2A:
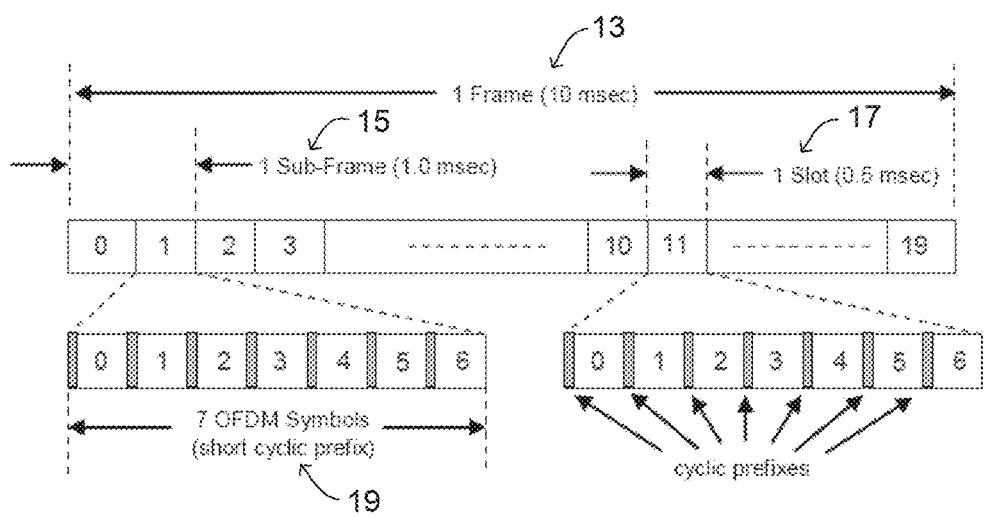
FIG. 2a schematically illustrates a generic frame structure used in communications over the wireless links of the system shown in FIG. 1.
Figure 2B:
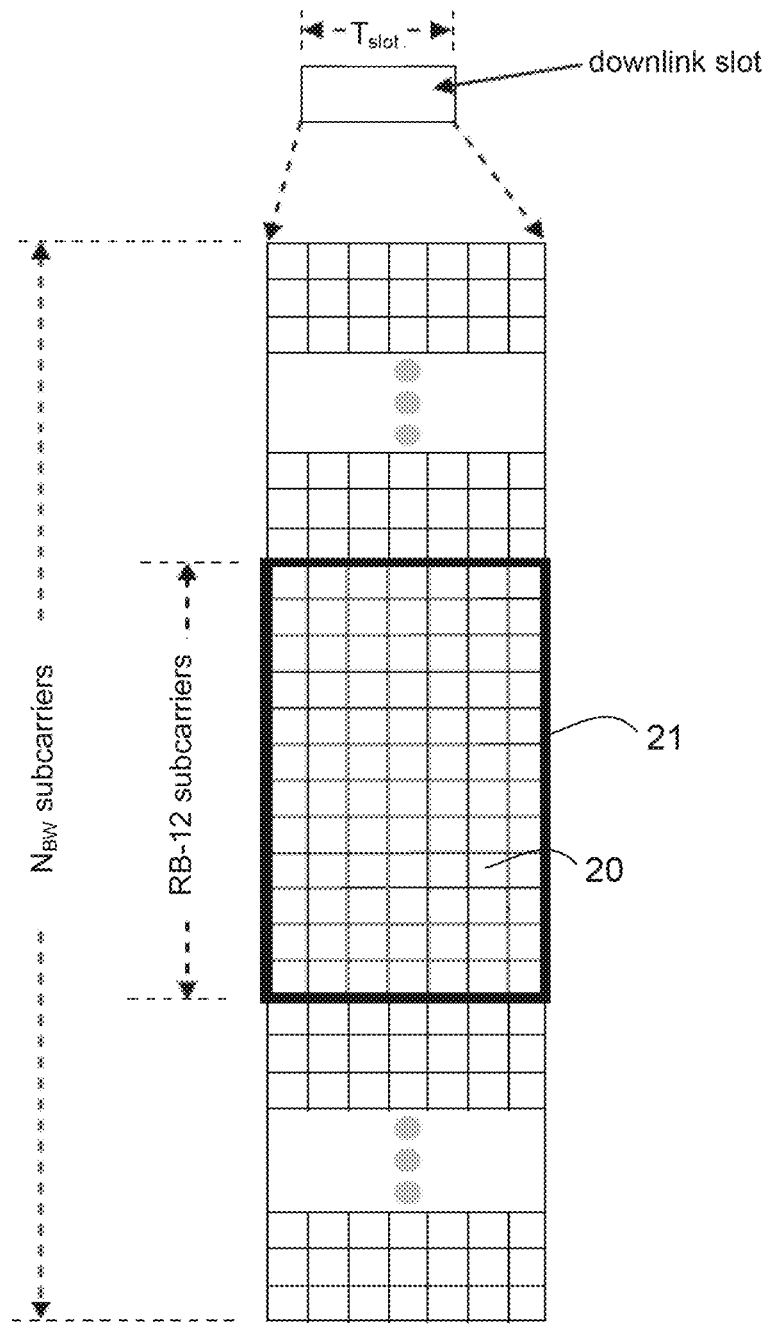
FIG. 2b schematically illustrates the way in which the frequency subcarriers are divided into resource blocks and the way that a time slot is divided into a number of OFDM symbols.

FIG. 2a illustrates one generic frame structure agreed for LTE communications over the air interface with the base station 5. As shown, one frame 13 is 10 msec long and comprises ten sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17 (although this could clearly be different). The transmitted downlink signal comprises NBW subcarriers for a duration of Nsymb OFDM symbols. It can be represented by a resource grid as illustrated in FIG. 2b. Each box 20 in the grid represents a single sub-carrier for one symbol period and is referred to as a resource element. As shown, each PRB 21 is formed from 12 consecutive sub-carriers and (in this case) seven symbols for each subcarrier; although in practice the same allocations are made in the second slot 17 of each sub-frame 15 as well.

Base Station

Figure 3:
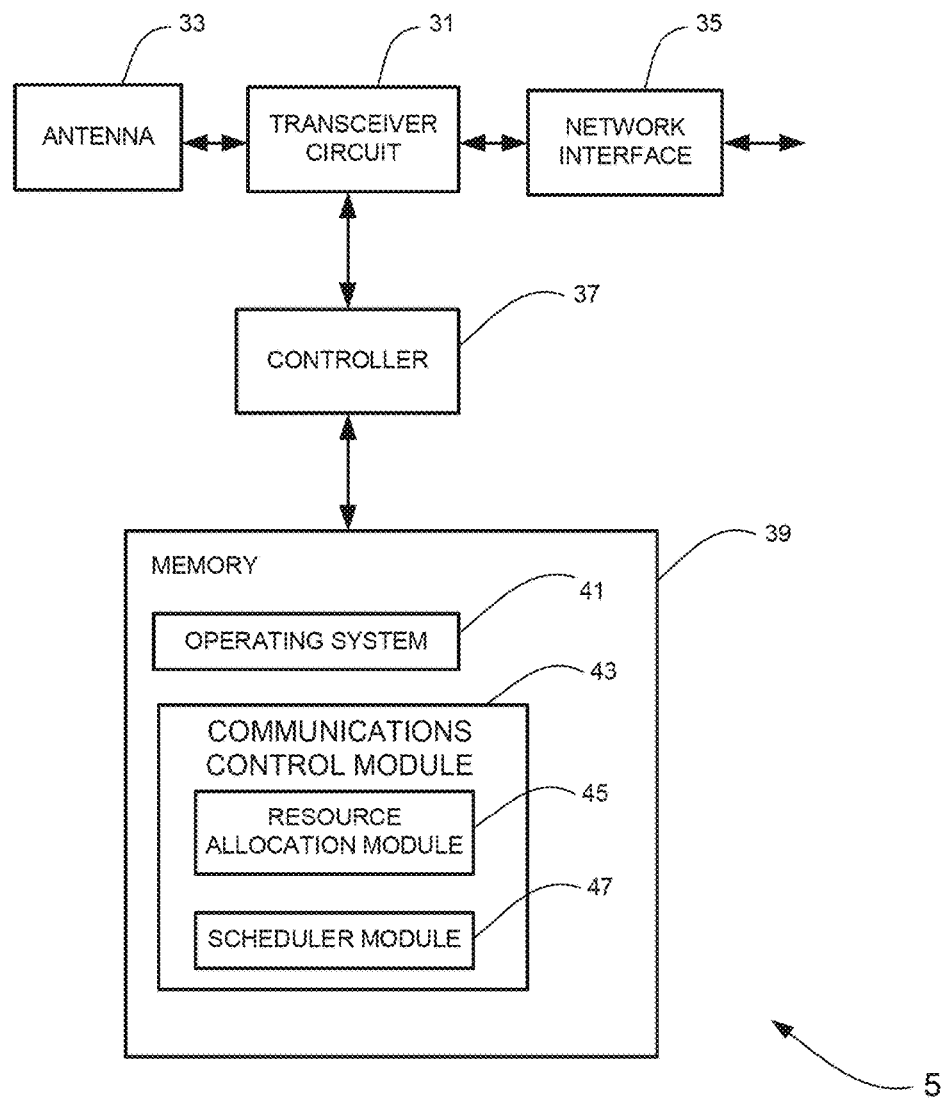
FIG. 3 is a block diagram illustrating the main components of a base station shown in FIG. 1.

FIG. 3 is a block diagram illustrating the main components of the base station 5 used in an embodiment of the invention. As shown, the base station 5 includes a transceiver circuit 31 which is operable to transmit signals to and to receive signals from the mobile telephones 3 via one or more antennae 33 and which is operable to transmit signals to and to receive signals from the telephone network 7 via a network interface 35. The operation of the transceiver circuit 31 is controlled by one or more controllers 37 in accordance with software stored in memory 39. The software includes, among other things, an operating system 41, a communications control module 43, a resource allocation module 45 and a scheduler module 47.

The communications control module 43 is operable to control communications between the base station 5 and the mobile telephones 3 and between the base station 5 and the network 7. The resource allocation module 45 is operable for allocating the resources used by the transceiver circuit 31 in its communications with the mobile telephones 3 for receiving uplink data from the mobile telephone 3 and for transmitting downlink data to the mobile telephone 3. The scheduler module 47 schedules the mobile telephones 3 for data communication opportunities within the sequence of sub-frames 15 forming the air interface between the base station 5 and the mobile telephones 3. The resource allocation module 45 and the scheduler module 47 work together to generate the resource allocation data and to send appropriate DCI control data to the mobile telephones 3 to inform them of their allocations using the new techniques described below.

Mobile Telephone

Figure 4:
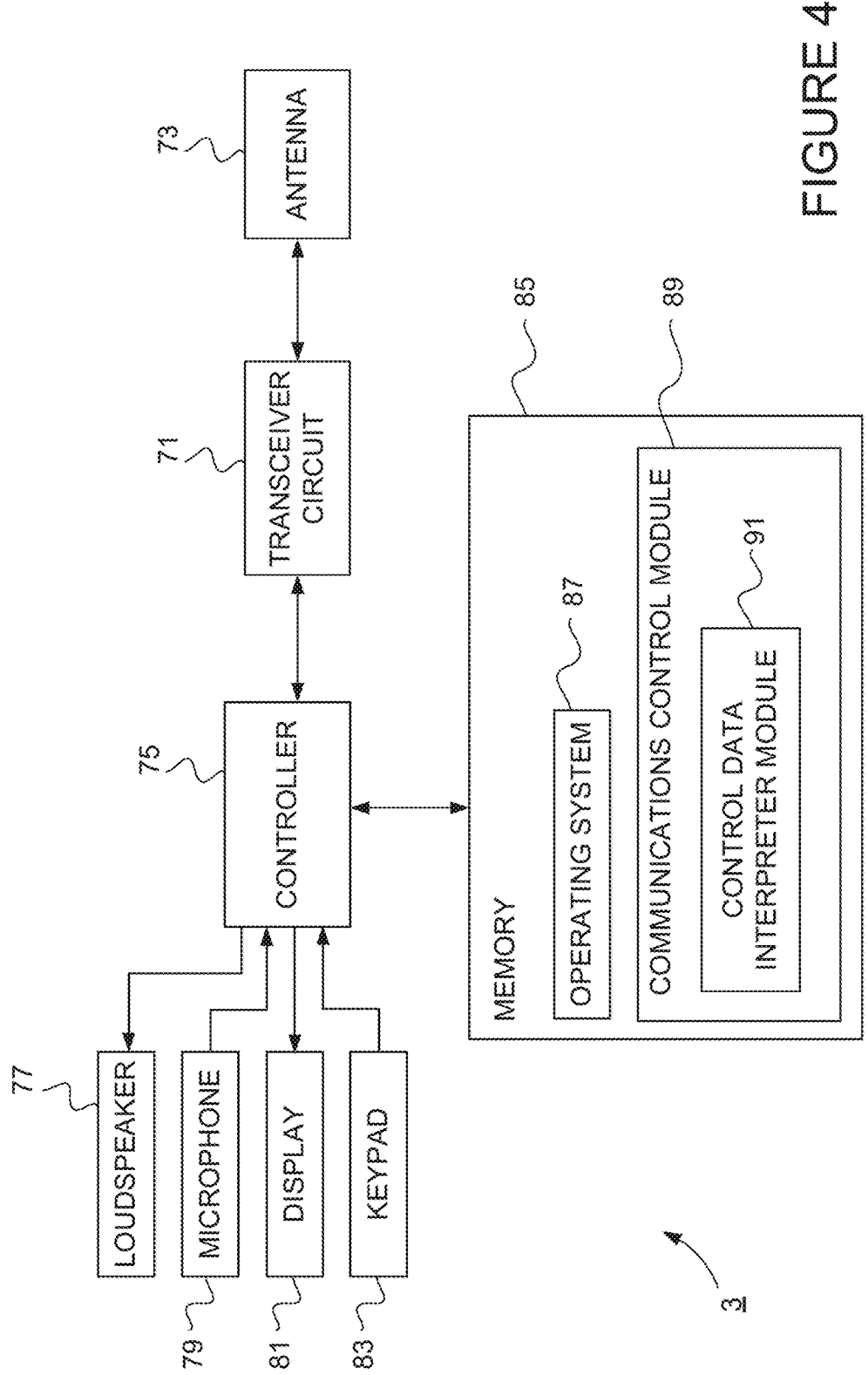
FIG. 4 is a block diagram illustrating the main components of a mobile telephone shown in FIG. 1.

FIG. 4 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes at least one controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a communications control module 89 having therein a control data interpreter module 91. The communications control module 89 is operable to control communications with the base station 5 using the resources allocated by the base station 5. The control data interpreter module 91 is configured to interpret the control information (in the manner discussed in more detail below) received from the base station 5 to determine the resources allocated by the base station 5 for use by the mobile telephone 3 in its communications with the base station 5.

In the above description, the base station 5 and the mobile telephone 3 are described, for ease of understanding, as having a number of discrete modules (such as the communications control, resource allocation and scheduler modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. Where separate modules are provided, the functionality of one or more of the above modules may be performed by a single module. For example, the functionality of the resource allocation module and of the scheduler module may be performed by a single scheduler module.

Resource Allocation

The resource blocks 21 are allocated to the mobile telephones 3 by the resource allocation module 45 in integer multiples of one resource block in the frequency domain. The minimum unit of resource that is assigned to a mobile telephone is one resource block 21. These resource blocks do not have to be adjacent to each other. The base station 5 decides on which mobile telephones 3 are to be allocated resources. This scheduling decision is taken by the scheduler module 47 and can be modified every transmission time interval (TTI) of 1 ms. The scheduling algorithm used by the base station 5 takes into account the radio link quality situation of different mobile telephones 3, the overall interference situation, Quality of Service requirements, service priorities, etc. in accordance with existing techniques.

Figure 5:
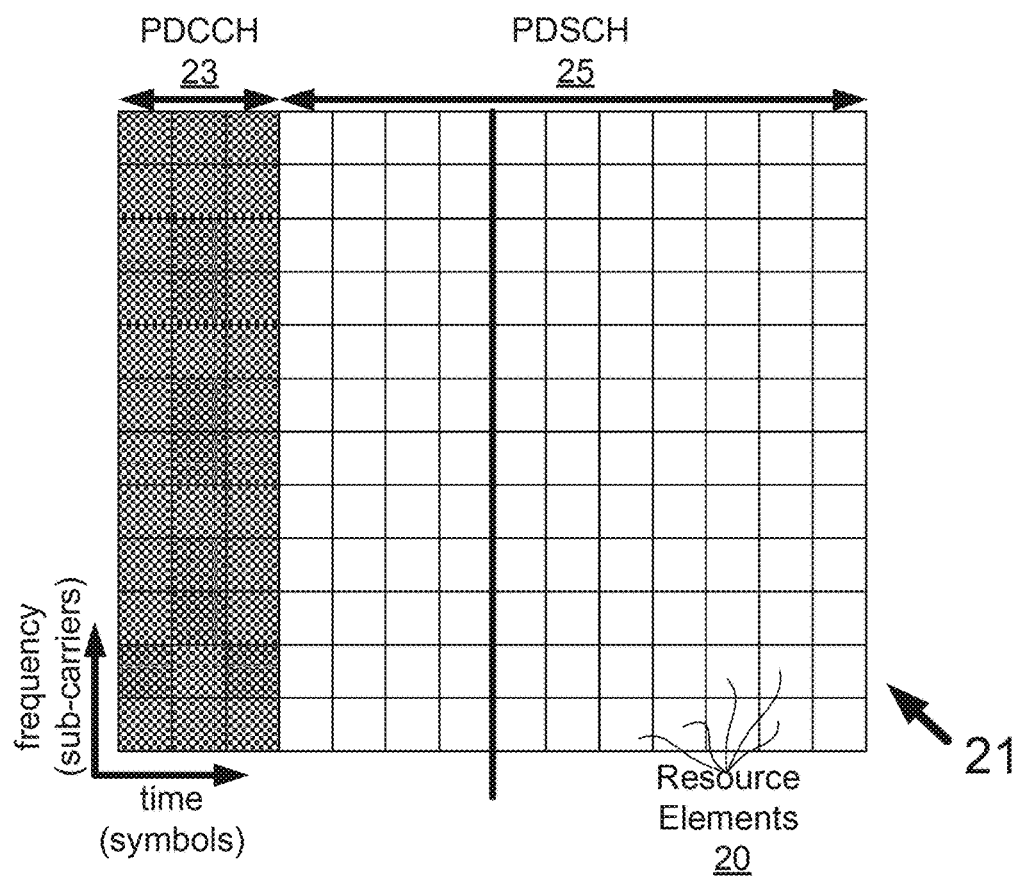
FIG. 5 illustrates the way in which a resource block is divided notionally into a control channel (PDCCH) and a data channel (PDSCH)

FIG. 5 illustrates one resource block 21 across two slots (one sub-frame 15); and shows how the resources within the block are typically split between the Physical Downlink Control Channel (PDCCH) 23; and the Physical Downlink Shared Channel (PDSCH) 25. The PDCCH 23 serves a variety of purposes. Primarily, it is used to convey the scheduling decisions to individual mobile telephones 3, i.e. scheduling assignments for uplink and downlink transmissions. The PDCCH 23 is located in the first OFDM symbols of a sub-frame 15. An additional Physical Control Format Indicator Channel (PCFICH) carried on specific resource elements in the first OFDM symbol of the sub-frame 15 is used to indicate the number of OFDM symbols for the PDCCH (1, 2, 3, or 4 symbols are possible). The PCFICH is needed because the load on the PDCCH can vary, depending on the number of mobile telephones 3 in a cell and the signaling formats conveyed on the PDCCH 23. The information carried on the PDCCH is referred to as downlink control information (DCI). Depending on the purpose of the control message, different formats of DCI are defined. The reader is referred to 3GPP, TS36.213 (V10.6.0), the content of which is incorporated herein by reference, for further details of the DCI formats.

FIG. 5 illustrates the situation where the PDCCH 23 is transmitted using the first three OFDM symbols of the sub-frame 15. The remaining resources are provided for the PDSCH 25. Sometimes, however, the first OFDM symbols do not have enough capacity to carry all the desired control data for the mobile telephones 3 being served by the base station 5 and a recent proposal is to transmit some control data for individual mobile telephones 3 within the OFDM symbols usually used for the PDSCH 25. One example of such control data is transmitted within a control channel that is referred to as the enhanced PDCCH (ePDCCH). In addition to increased control channel capacity, the use of such ePDCCH channels allows for mobile telephone specific beam-forming and frequency selective scheduling to be applied to the ePDCCH transmissions and to make it easier to co-ordinate ePDCCH between neighbouring base station cells to reduce interference. However, the transmission of the ePDCCH in the OFDM symbols usually used to carry the PDSCH 25 causes problems for the efficient allocation of resources in the PDSCH 25 by the base station 5. To understand these problems, a description will now be given of different types of resource allocation techniques that have been agreed for use in the LTE communication system, these include Type 0 allocations, Type 1 allocations and Type 2 allocations.

Type 0 Allocation

Figure 6A:
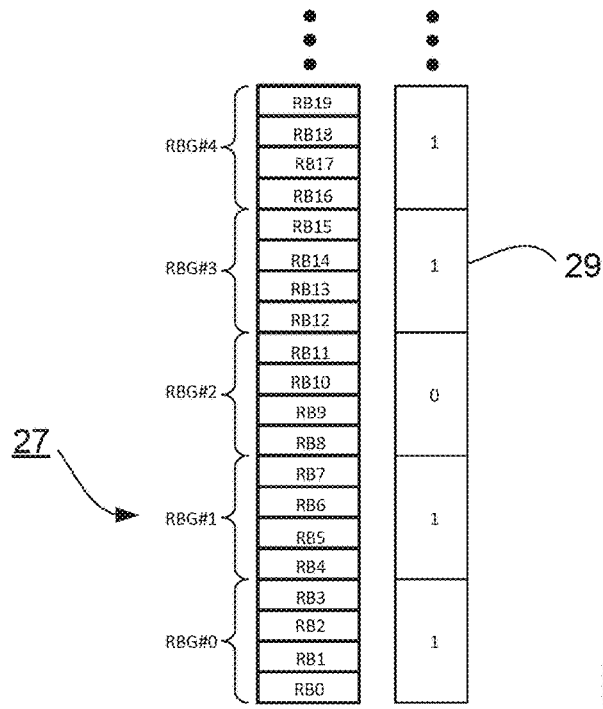
FIG. 6a schematically illustrates the way in which physical resource blocks are grouped into resource block groups and how the resource block groups may be assigned using a Type 0 resource allocation technique.

FIG. 6a illustrates how the physical resource blocks 21 are grouped into a plurality of consecutive resource block groups (RBGs) 27. Where possible each group contains an equal number of resource blocks known as the RBG size (P), although where the number of consecutive resource blocks is not exactly divisible by the desired RBG size, the last group may contain fewer resource blocks. FIG. 6a illustrates the case where the RBG size is four and shows the first five RBGs—RBG0 to RBG4.

In resource allocations of Type 0, the resource block assignment information (generated by the base station and sent to a mobile telephone 3) includes a bitmap indicating the resource block groups (RBGs) that are allocated to that scheduled mobile telephone 3. The order of the RBG to bitmap bit mapping is in such a way that RBG 0 to $RBG^{N_{RBG}-1}$ are mapped to MSB to LSB of the bitmap (although it could of course be the other way around). The RBG is allocated to the mobile telephone 3 if the corresponding bit value in the bitmap is 1, the RBG is not allocated to the mobile telephone 3 otherwise, as described in section 7.1.6.1 of 3GPP, TS36.213 (V10.6.0). FIG. 6a, illustrates an example of part of the bitmap 29 that is assigned to a scheduled mobile telephone 3, illustrating in this case that the scheduled mobile telephone 3 has been allocated the resource blocks in groups RBG0, RBG1, RBG3 and RBG4.

As those skilled in the art will appreciate, when control data is also transmitted in the region normally assigned for the PDSCH 25, some of the resources within a RBG 27 may not be available for carrying user data even though they do not contain control data. For example, if RBG15 is used to carry an ePDCCH for the scheduled mobile telephone 3 (or the ePDCCH for another mobile telephone), then the other resources in the same resource block group can't be allocated for the PDSCH as the legacy Type 0 resource allocation data can only allocate resources in units of resource block groups. This leads to a fragmented and wasteful use of the available resources.

Type 2 Allocation

Figure 6B:
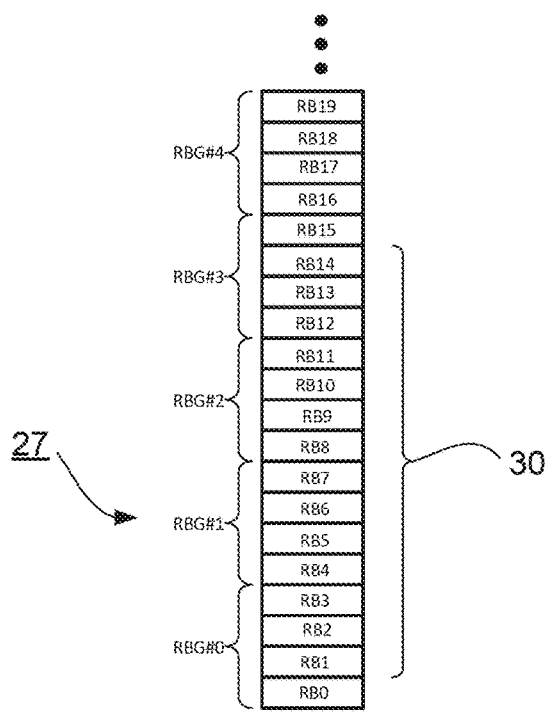
FIG. 6b schematically illustrates the way in which physical resource blocks are grouped into resource block groups and how resources within the resource block groups may be assigned using a Type 2 resource allocation technique.

In resource allocations of Type 2, the resource block assignment information indicates to a scheduled mobile telephone 3 a set of contiguously allocated virtual resource blocks, as described in section 7.1.6.3 of 3GPP, TS36.213 (V10.6.0). For DCI format 1A, a Type 2 resource allocation field includes a resource indication value (RIV) corresponding to a starting resource block ($RB_{start}$) and a length in terms of virtually contiguously allocated resource blocks $L_{CRBs}$. FIG. 6b illustrates an example resource allocation 30 that identifies RB1 as the starting resource block and including a length value corresponding to 14 resource blocks—meaning that RB1 to RB14 are allocated to that scheduled mobile telephone 3 in that sub-frame 15. However, there is an issue for Type 2 resource allocation (which also applies to Type 0 resource allocation as well) when the mobile telephone 3 is allocated for contiguous resource blocks and ePDCCHs for both DL (downlink) and UL (uplink) grants for the same mobile telephone 3 are located within those contiguous resource blocks. In particular, if the mobile telephone 3 can not detect the UL grant, it will result in the mobile telephone 3 not being able to decode the PDSCH as well as corrupting the DL HARQ buffer (used for acknowledging receipt of downlink data). Further, since the HARQ buffer is corrupted, such transmission errors can't be recovered by HARQ retransmissions and so retransmission must be performed by higher layers (i.e. the RLC layer). The simple solution to this problem is to limit the range of the resources allocated to a scheduled mobile telephone 3 so that the allocated PDSCH resources do not overlap with the control data, but again this leads to inefficient use (i.e. gaps) of the available resources in the PDSCH 25.

Type 1 Allocation

Figure 6C:
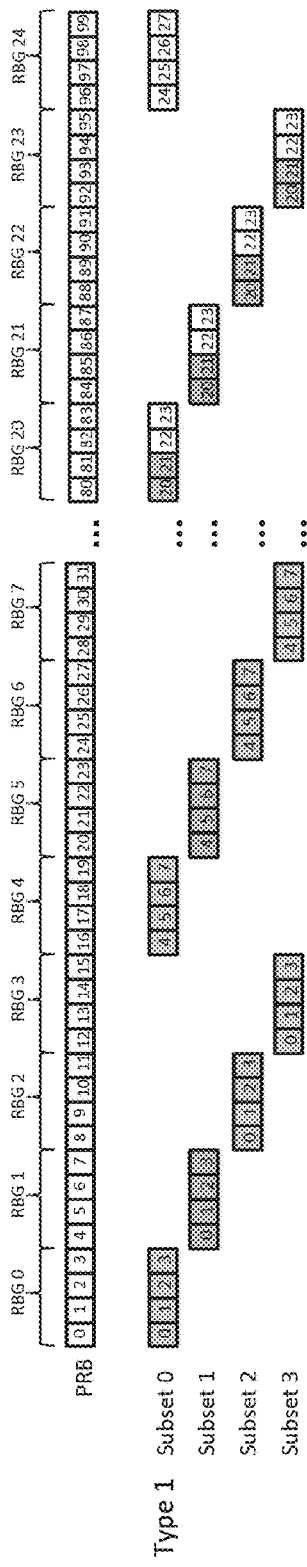
FIGS. 6c and 6d schematically illustrate the way in which physical resource blocks are grouped into resource block groups and how the resource block groups arranged into subsets and illustrating the way in which resources within each subset may be assigned using a Type 1 resource allocation technique.
Figure 6D:
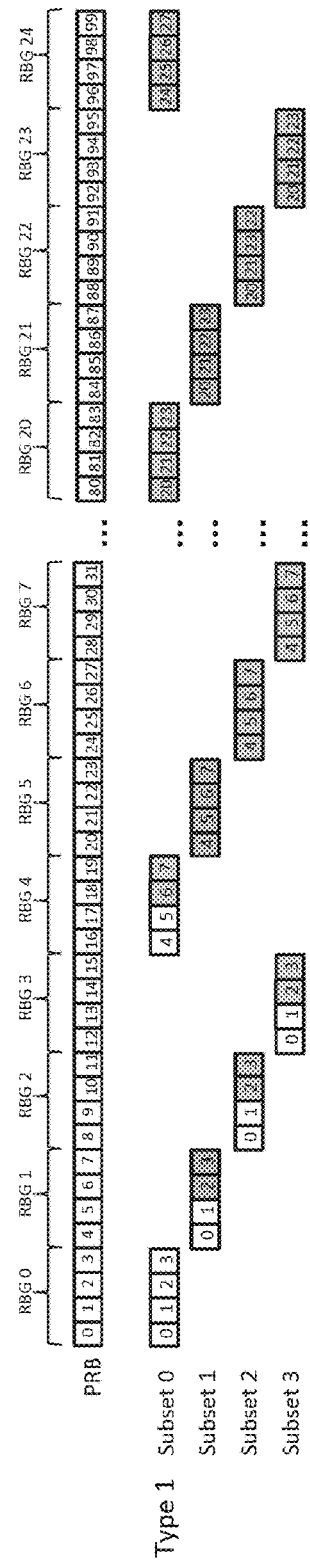

In resource allocations of Type 1, the resource block groups are divided into subsets. An example of this is illustrated in FIGS. 6c and 6d. In particular, these Figures illustrate the resource blocks for a 20 MHz supported bandwidth which is divided into one hundred resource blocks. These resource blocks are grouped into twenty five resource block groups each of which (RBG0 to RBG24) contains four resource blocks (RBG size=4). The physical resource blocks are indexed consecutively across the bandwidth (typically from zero to ninety-nine for 20 MHz).

The resource block groups are further arranged in to a plurality of subsets each of which includes a plurality of resource block groups distributed evenly across the bandwidth. The number of RBG subsets for a particular bandwidth and the spacing between resource block groups within the subset are both equal to the RBG size. By way of illustration, in the example of FIGS. 6c and 6d, the twenty five resource block groups are arranged into four (i.e. the RBG size for 20 MHz) subsets. The first subset contains the first, fifth, ninth, thirteenth, seventeenth, twenty first and twenty fifth resource block groups; the second subset contains the second, sixth, tenth, fourteenth, eighteenth and twenty second resource block groups; the third subset contains the third, seventh, eleventh, fifteenth, nineteenth and the twenty third resource block groups; and the fourth subset contains the remaining resource block groups.

A similar approach is used for dividing up different supported bandwidths. The RBG size (and hence number of subsets) for the different bandwidths is illustrated in the table below:

| System bandwidth, MHz | $N_{RB}^{DL}$ | P |
|---|---|---|
| 1.4 | 6 | 1 |
| 3 | 15 | 2 |
| 5 | 25 | 2 |
| 10 | 50 | 3 |
| 15 | 75 | 4 |
| 20 | 100 | 4 |

Where 'P' is the RBG size (and hence the number of RBG subsets) and $N_{RB}^{DL}$ is the number of resource blocks into which the bandwidth is divided for downlink transmission.

As described in TS 36.213, the legacy Type 1 resource allocation technique applies one bit for one resource block for the resource blocks in a selected subset of the RBGs. Type 1 can not allocate contiguous resource blocks of more than one RBG (i.e. it can only handle distributed resource blocks to achieve frequency diversity gain), hence, its application for frequency selective scheduling is limited. In detail, as illustrated in FIGS. 6c and 6d respectively, Type 1 resource allocation has the following fields:

The first field, with ceil($\log_2$ P) bits, is used to indicate the selected RBG subset from among the RBG subsets.

The second field, with one bit, is used to indicate a shift of the resource allocation span within a subset. A bit value of 1 indicates shift is triggered to the right (Right justified—illustrated in FIG. 4d). Otherwise the shift is triggered to the left (Left justified—illustrated in FIG. 4c).

The third field includes a bitmap, where each bit of the bitmap addresses a single resource block in the selected RBG subset. The size of this field is $N_{RB}^{TYPE1} = \lceil N_{RB}^{DL}/P \rceil - \lceil \log_2(P) \rceil - 1$.

Therefore, a scheduled mobile telephone 3 will use the first field in the received resource allocation data to identify the subset of RBGs, the second field to identify if the allocation is left or right shifted and the third field to identify the resource blocks in the subset that have been allocated.

New Resource Allocation Techniques

A description will now be given of a number of new resource allocation techniques that help to at least alleviate some of the inefficiencies discussed above.

Solution 1

As a first solution to at least some of the above problems, the base station 5 is also arranged to generate and send supplementary information (e.g. an ePDCCH allocation indication) to the mobile telephone 3 to indicate which resource blocks should be excluded from the legacy resource allocation (Release 10 Type 0, Type 1 and Type 2 resource allocation techniques—as described above) because they contain ePDCCH transmissions. The mobile telephone 3 (and in particular the control data interpreter module 91) is arranged to combine the supplementary information with its legacy resource allocation message in order to work out the actual downlink resources allocated to it by the base station 5. In this way, resource blocks which themselves do not contain an ePDCCH transmission but which form part of a resource block group that does contain at least one ePDCCH transmission, can still be allocated to the mobile telephone 3 for the PDSCH.

Only mobile telephones 3 compatible with later versions of the LTE standard (Rel-11 and beyond) would be able to read and use the supplementary information. Older mobile telephones 3 would not, but the base station 5 can ensure that resource allocations for such "legacy" mobile telephones 3 do not also include resources used for ePDCCH (or other similar control data that is transmitted in the OFDM symbols used for the PDSCH 25), thereby ensuring that the system remains backwards compatible.

Configuration of the ePDCCH Allocation Region

To reduce the size of the supplementary information, a subset of physical resource blocks (the 'ePDCCH region') may be predefined (known to both the base station 5 and the mobile telephones 3 in advance), that impose a restriction that the ePDCCH transmissions can only be located in this sub-set of resource blocks. In this case, the supplementary information only has to describe which resource blocks in this subset should be excluded from the legacy resource allocation. This can significantly reduce the signalling overhead for the supplementary information.

The 'ePDCCH region' subset of resource blocks could be signalled in advance to the mobile telephone 3 by higher layer signalling (e.g. Radio Resource Control (RRC) signalling) or on a broadcast channel. Alternatively this sub-set of resource blocks could change dynamically from sub-frame 15 to sub-frame 15 based on a pre-defined pattern which is again signalled to the mobile telephone 3 by higher layer signalling or on a broadcast channel, or based on a fixed rule. For example, the exact location of the set of ePDCCH resource blocks for a given sub-frame 15 could be implicitly determined using some defined calculation involving, for example, the Cell ID of the base station cell and the sub-frame number for that sub-frame 15. In one embodiment, the resource blocks in the ePDCCH region are concentrated into one part of the system bandwidth, although there may be advantages to distributing the resource blocks of the ePDCCH region across the system bandwidth—to allow the ePDCCH for each mobile telephone 3 to be transmitted in a region of the system bandwidth that has good channel conditions between the base station 5 and the mobile telephone 3 (thereby increasing the chances of successfully communicating the ePDCCH to the mobile telephone 3).

Signalling of the ePDCCH Allocation Indication

One possible form that the supplementary information can take is a bitmap, with one bit for each physical resource block in the ePDCCH region subset, indicating whether or not the corresponding resource block is to be excluded from the legacy resource allocation.

Alternatively, multiple resource block subsets, of varying sizes, could be defined in advance and each subset associated with an index value. The base station 5 and the mobile telephones 3 would maintain data (e.g. a look up table) that identifies the resource block subsets and their associated index value. In operation, in each sub-frame 15 the base station 5 would select the resource block subset which it judges to be most advantageous to contain the required ePDCCH transmissions in that sub-frame 15, and it would signal the associated index value to the mobile telephones 3. In response, the mobile telephones 3 would receive the signalled index value and would use the stored data to identify the associated resource block subset. The mobile telephones 3 would then exclude all the resource blocks in the indicated resource block subset from its legacy resource allocation (regardless of whether or not they actually contain ePDCCH transmissions). Whilst this approach may be less efficient in terms of resource block usage than the bitmap method (because resource blocks in the selected resource block subset which do not actually contain ePDCCH transmissions would be wasted), the size of the supplementary information can be smaller than the bitmap method in some cases which reduces signalling overhead.

There are different options how to signal the supplementary information to the mobile telephones 3 as follows:

ePDCCH DCI formats: For both Type 0 and 2, the supplementary information can be placed in the DCI format as a part of the resource allocation scheme when ePDCCH is configured. The number of bits required for this supplementary information should be less than or equal to the size of the ePDCCH region in terms of number of resource blocks contained therein. For example the number of bits for the supplementary information for a 10 MHz system bandwidth can be one of {8 bits, 12 bits, 16 bits}.

ePCFICH or new DCI format: the supplementary information can also be signalled dynamically (in each sub-frame 15) in the ePCFICH if it is agreed or in a new DCI format that is supposed to indicate the ePDCCH region/resources. Thus the supplementary information will indicate dynamically the actual resource blocks occupied by the ePDCCHs for all mobile telephones 3 from the set of resource blocks allocated to the ePDCCH region. In this case, the size of the supplementary information will be equal to the size of the ePDCCH region in terms of number resource blocks contained therein.

The supplementary information may be signalled to each mobile telephone 3 individually as an extension of its legacy resource allocation, or it may be separately broadcast to all mobile telephones 3 in the base station cell.

If the supplementary information is signalled to each mobile telephone 3 individually as an extension of its legacy resource allocation, it would allow for the possibility of signalling different supplementary information to each mobile telephone 3. In some scenarios this could provide additional flexibility by allowing, for example, two mobile telephones 3 to be assigned partially overlapping legacy resource allocations, with the mobile telephone-specific supplementary information being used to resolve the conflict (so that the same resources are not allocated to both mobile telephones 3).

Additionally, if the supplementary information is signalled to each mobile telephone 3 individually as an extension of its legacy resource allocation then the supplementary information and legacy resource allocation may be combined into a single ePDCCH transmission.

Further, if the supplementary information is signalled to each mobile telephone 3 individually as an extension of its legacy resource allocation (within the mobile telephone's own DL Grant ePDDCH) then the supplementary information need not include an indication of the mobile telephone's own DL Grant ePDCCH allocation, since it may be assumed that the mobile telephone 3 already knows this by virtue of the fact that it has decoded the DL Grant ePDCCH message.

Further still, if the supplementary information is signalled to each mobile telephone 3 individually as an extension of its legacy resource allocation, the supplementary information only needs to describe that part of the ePDCCH region resource block subset which overlaps with the mobile telephone's legacy resource allocation (i.e. those resource blocks which are included in both the ePDCCH region PRB subset and the mobile telephone's legacy resource allocation). Since the mobile telephone 3 knows both the ePDCCH region PRB sub-set and its own legacy resource allocation, it can compute the overlapping part and interpret the supplementary information accordingly. This will typically reduce the size of the supplementary information. However this would also mean that the size of the supplementary information is unknown to the mobile telephone 3 in advance, requiring additional blind decoding attempts.

In particular, as discussed above, control data sent to a mobile telephone 3 can have one of a number of predetermined formats (DCI formats, each having a different size) and the mobile telephone 3 has to try to decode the PDCCH 23 to find out if it contains control data in one of those formats for that mobile telephone 3. As the mobile telephone 3 typically does not know which DCI format may be used, each decoding attempt is referred to as a "blind" decoding attempt. Control data for a specific mobile telephone 3 is scrambled with the mobile telephone's identity, so that only that specific mobile telephone 3 can decode the control data. Therefore, if the supplementary information can have variable size, then this will require each mobile telephone 3 to perform different blind decoding attempts for each of the possible sizes. To address this issue, it may be advantageous to restrict the number of supplementary information bits to be one of a predefined set of lengths, e.g. {2, 4, 8, 12, 16} bits, each corresponding to a different ePDCCH DCI format size. Alternatively, the DCI format size selected in a given sub-frame 15 could be separately signalled on PDCCH (if it is present) or on ePCFICH or on a separate ePDCCH transmission containing only the DCI format size indication.
Examples of Solution 1

In this section we give examples of the case in which the supplementary information is signalled to each mobile telephone 3 individually as an extension of its legacy resource allocation.

Figure 7:
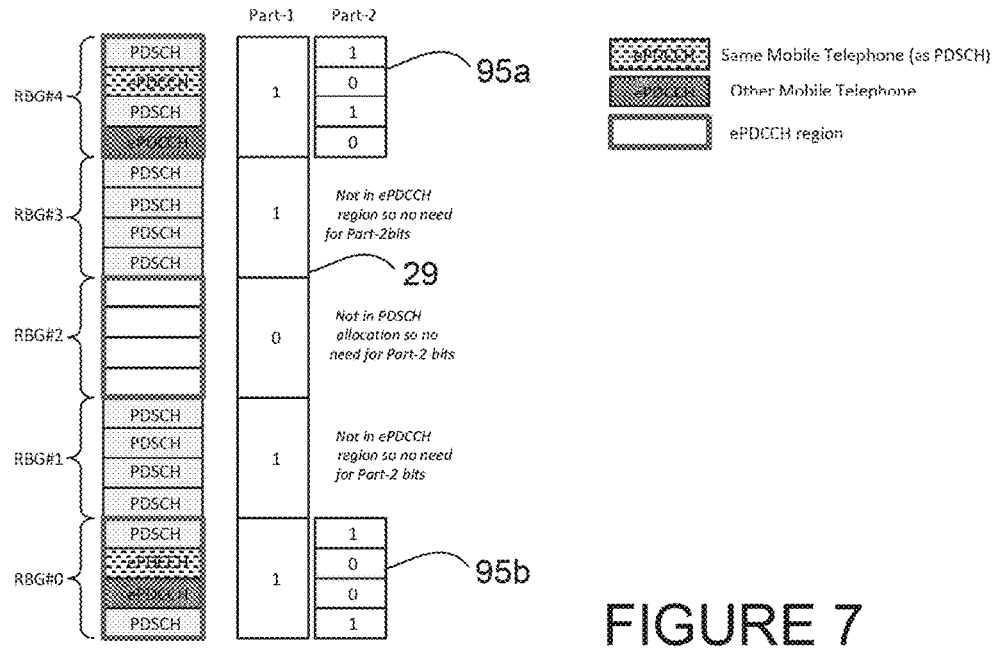
FIG. 7 illustrates one way in which resources may be allocated that allows different resource blocks within the same resource block group to be assigned for PDSCH and ePDCCH when a Type 0 resource allocation technique is used.

As discussed above, in resource allocations of Type 0, the resource block assignment information includes a bitmap indicating the resource block groups (RBGs) that are allocated to the scheduled mobile telephone 3. FIG. 7 shows an example of a PDSCH allocation which overlaps with ePD-CCHs allocations for the same mobile telephone and the ePDCCHs allocations for other mobile telephones 3. In the figure, Part-1' corresponds to the legacy resource allocation 29 (ie. a Rel-10 Type 0 allocation) and Part-2' corresponds to the supplementary information 95, which takes the form of a bitmap. As can be seen from FIG. 7, the legacy resource allocation 29 assigns resource block groups RBG0, RBG1, RBG3 and RBG4 to the mobile telephone 3. FIG. 7 represents the ePDCCH region with the bold boxes that correspond in size to whole resource block groups, but in general this need not be the case. The ePDCCH regions corresponding to resource block groups RBG4 and RBG0 both include PDSCH allocations for the mobile telephone 3 as well as ePDCCH allocations for the mobile telephone 3 and ePDCCH allocations for other mobile telephones. As shown in FIG. 7, the supplemental information 95 is split, in this example, into a respective bitmap portion (95a and 95b) for each ePDCCH region that includes both a PDSCH allocation and an ePDCCH allocation. In practice, a single bitmap 95 would be signalled to the mobile telephone 3 and then the mobile telephone 3 would relate the relevant parts of the bitmap to the corresponding parts of the PDSCH resource allocation 29.

As can be seen from bitmap portion 95a, the bits thereof corresponding to the resource blocks containing the ePDCCH portions of resource block group RBG4, are set at the value "0" and the other bits are set at the value "1". This is similarly true for the bits of the second bitmap portion 95b in respect of resource block group RBG0. Accordingly, the mobile telephone 3 can receive the legacy resource allocation 29 and then use the bitmap 95 to exclude from the allocated resources those that correspond to ePDCCH transmissions.

Figure 8:
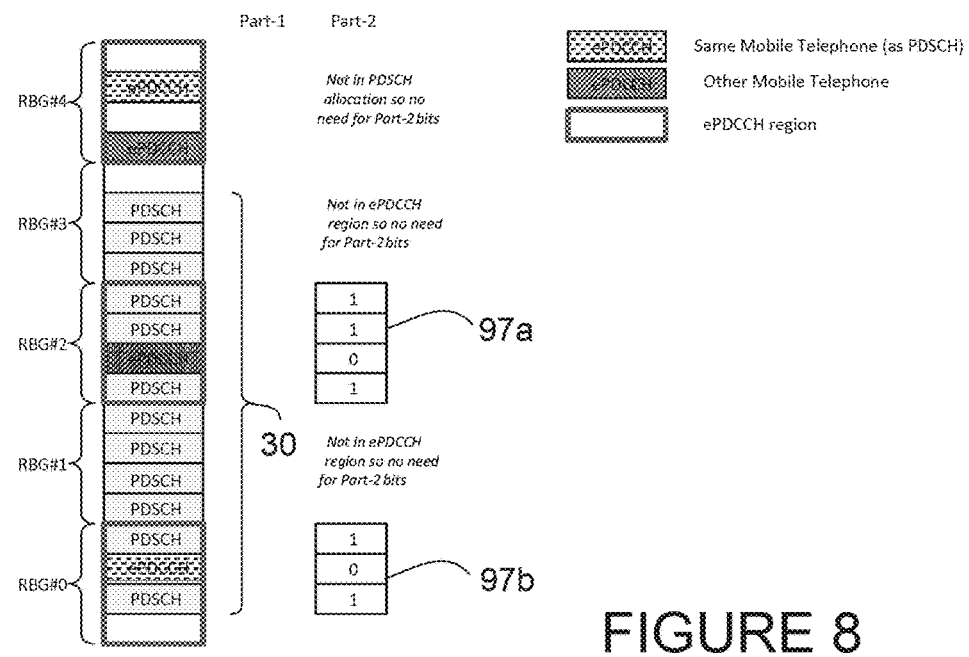
FIG. 8 illustrates another way in which resources may be allocated that allows different resource blocks within the same resource block group to be assigned for DPSCH and ePDCCH when a Type 2 resource allocation technique is used.

With regard to Type 2 resource allocations, as discussed above, the legacy resource block assignment information 30 indicates to a scheduled mobile telephone 3 a set of contiguously allocated virtual resource blocks. An example of this method is illustrated in FIG. 8. As before, Part-2' corresponds to the new supplementary information 97. In this example, the Part-2 information 97 is also in the form of a bitmap (notionally split into portions 97a and 97b), where each bit of the bitmap addresses a single virtual resource block in the set of virtual resource blocks that overlap between the ePDCCH region (also outlined by bold boxes) and the mobile telephone's legacy Type-2 resource allocation 30, in such a way that the MSB to LSB of the bitmap are mapped to the virtual resource blocks in increasing frequency order. A virtual resource block is not allocated to the mobile telephone 3 for the PDSCH 23 if the corresponding bit value in the bitmap 97 field is 0, and the virtual resource block is allocated to the mobile telephone for the PDSCH 23 if the corresponding bit value in the bit field is 1. In this example, as the mobile telephone 3 has not been allocated resources in resource block group RBG4, there is no need for the supplemental information 97 to include bits in respect of those parts of RBG4 corresponding to ePDCCH allocations.
Solution 2

Instead of sending supplementary information, some or all of the existing Rel-10 DCI formats may be "overloaded" (in the sense of the use of the term in computer science), by defining one or more new DCI formats using the same number of message bits as the legacy DCI format, and then informing the mobile telephone 3 which overloaded format it should use to interpret the message. More specifically, at present, when the mobile telephone 3 decodes a DCI format, it knows which DCI format has been decoded by its length—so it inherently knows how to interpret the bits in that message. However, by adding new DCI formats having the same size (in terms of number of bits), the mobile telephone 3 now does not know how to interpret the bits—as they will need to be interpreted differently between the legacy DCI format and the new DCI format. Therefore, the mobile telephone 3 needs to be told how to interpret the message as well. The purpose of "overloading" the DCI formats in this way is to extend the repertoire of resource allocation types that the base station 5 can use whilst avoiding increasing the number of different DCI format sizes (which would require additional blind decoding attempts by the mobile telephone 3). The "cost" of doing so is that the mobile telephone 3 now also has to be told if the received DCI format is a legacy DCI format or a new DCI format.

The way in which the base station informs the mobile telephone 3 as to whether the DCI format is new or legacy (and if there are multiple new formats—which one should be used) may be specific to the mobile telephone 3 or it may be generic to all new Rel-11 devices. Of course, legacy mobile telephones 3 will only support legacy DCI formats (and so the base station 5 can only use the legacy DCI formats when allocating resources to those legacy mobile telephones). The data informing the mobile telephone 3 if the DCI format is legacy or new may be signalled to the mobile telephone 3 using higher layer signalling or it could be signalled dynamically by adding a 'format indicator' field to the legacy DCI format. On detecting a legacy DCI format the UE would first read the format indicator and then interpret the remainder of the message accordingly.

Examples of Proposed Solution 2

In this section we give examples of the case in which overloading is used to define new DCI formats.

As discussed above, in resource allocations of Type 0, the resource block assignment information includes a bitmap indicating the resource block groups (RBGs) that are allocated to the scheduled mobile telephone 3. Resource allocation Type 0 can be overloaded in such a way that the existing resource allocation bit-map for one or more resource block groups can be interpreted differently based on the detected ePDCCH grants in these resource block groups. For example, if the mobile telephone 3 detects a DL grant ePDCCH transmission in a particular resource block group, then the mobile telephone 3 may be programmed to infer that that resource block group is part of the mobile telephone's PDSCH allocation (note that the base station scheduler 47 will have to allocate those resources to the mobile telephone 3 accordingly). In this case, the bit in the RBG bitmap 95 corresponding to this resource block group may be re-used for another purpose. For example, it may be used to signal the presence or absence of an UL grant ePDCCH transmission for the same mobile telephone 3 in the same resource block group. This could be useful in case the mobile telephone 3 fails to detect the UL grant ePDCCH transmission by itself, which would otherwise result in a PDSCH decoding error. Preferably, the UL grant and the DL grant are allocated in adjacent resources so that if this bit indicates the presence of an UL grant, the mobile telephone 3 can decode the PDSCH by excluding the resources adjacent the DL grant. Additionally, if this bit indicates that there is no UL grant, then the mobile telephone 3 does not need to perform any blind decoding to try to find an UL grant DCI message, hence less energy is consumed by the mobile telephone 3.

Enhanced Type 1 Resource Allocation

One way of overcoming the problem of resource fragmentation as a result of allocating the PDSCH around the ePDCCH channel for any mobile telephones 3, is to have a finer RB granularity of resource allocation mechanism (i.e. one RB resolution) that can handle both contiguous and non-contiguous resource allocations, and applicable to frequency selective scheduling. There are few options:

Option 1:

Overloading the Type 1 resource allocation into contiguous RB-level resolution via Radio Resource Control (RRC) reconfiguration as follows:

Default: same as current legacy Type 1 approach (distributed subset approach discussed above) intended to achieve frequency diversity gain, for example, for mobile telephones at the edge of the base station's cell.

Figure 9:
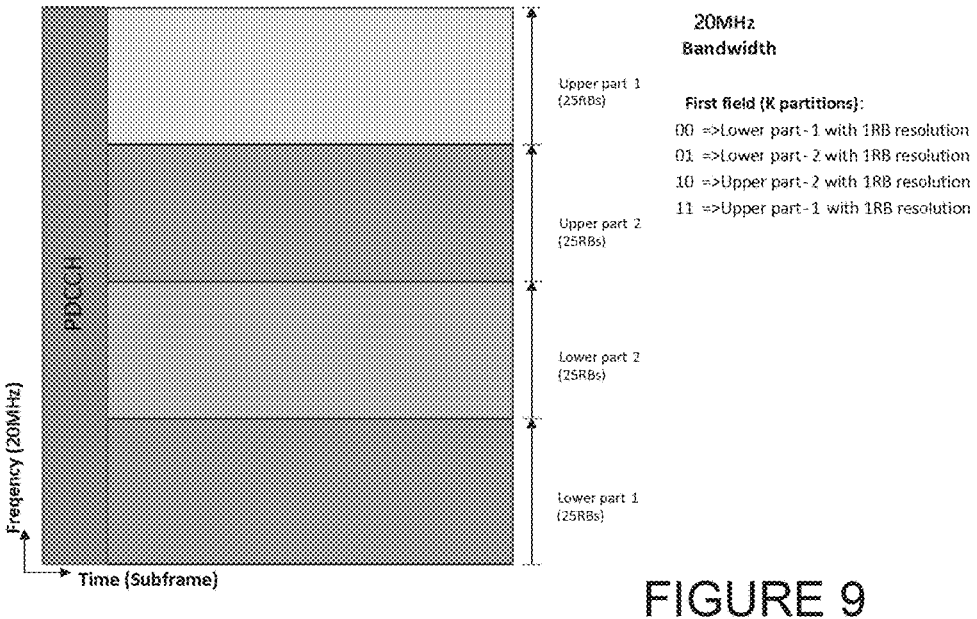
FIG. 9 illustrates the way in which a legacy Type 1 allocation may be interpreted in a new way to for the efficient allocation of resources combining control data and PDSCH.

RRC signalling in semi-static manner to change the default to contiguous resources with one resource block granularity as illustrated in FIG. 9. The purpose is to achieve frequency selective scheduling (such that different mobile telephones 3 are scheduled onto different frequency sub-bands—depending on the radio conditions between the base station 5 and the mobile telephone 3 at the time) and also to tackle the issue of resource fragmentation. In this case, the mobile telephone 3 would interpret the received DCI message in a different way (and of course the base station 5 would change the way in which it generates the DCI message) as follows:

The first field with ceil($\log_2 K$) bits is used to indicate a selection of one out of K partitions of the system bandwidth where each bandwidth part contains contiguous resource blocks with one RB resolution. The example illustrated in FIG. 9, shows the specific case where the number of partitions equals the number of resource blocks in each resource block group (P).

The second field with one bit is used to indicate a shift of the resource allocation span within the selected bandwidth part. A bit value of 1 indicates shift is triggered to the right (Right justified), otherwise shift is triggered to the left (Left justified).

The third field includes a bitmap, where each bit of the bitmap addresses a single RB in the selected bandwidth part and indicates if the resource block is allocated to the mobile telephone 3. The size of this field is $N_{RB}^{TYPE1} = \lceil N_{RB}^{DL}/P \rceil - \lceil \log_2(P) \rceil - 1$.

Figure 10:
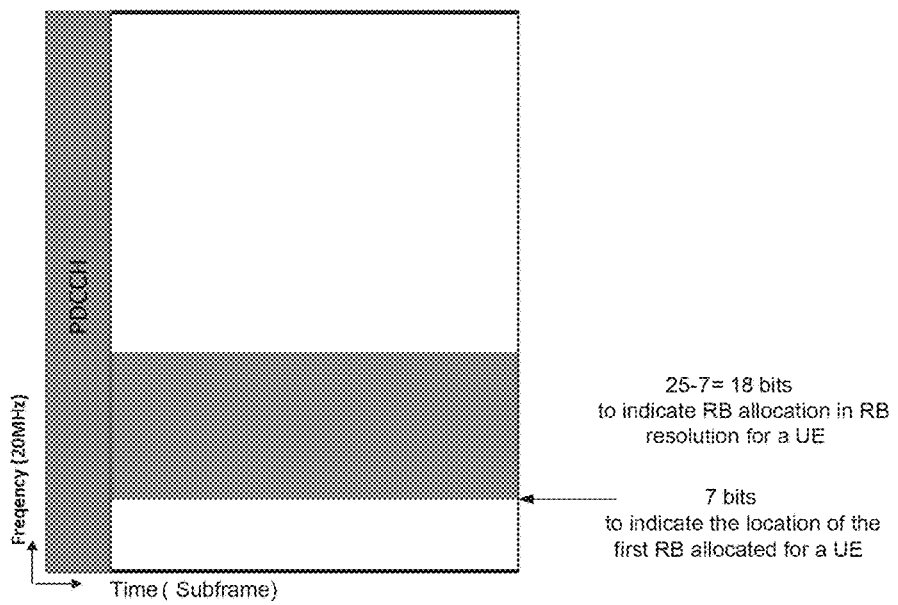
FIG. 10 illustrates another way in which a legacy Type 1 allocation may be interpreted in a new way to for the efficient allocation of resources combining control data and PDSCH.

Option 2:

Overloading the Type 1 resource allocation into contiguous RB-level resolution via dynamic signalling. Option 1 above just divided the system bandwidth into a small number of K partitions of contiguous resources with one RB granularity; and the staring position of each partition is fixed. In order to provide more flexibility in the starting position, as shown in FIG. 10, the resource allocation Type 1 can be further enhanced by having only two fields which can be signalled dynamically as follows:

The first field with $\lceil \log_2 (N_{RB}^{DL}) \rceil$ bits is used to indicate the start RB of the resource allocation anywhere in the system bandwidth.

The second field includes a bitmap, where each bit of the bitmap addresses a single RB in the resource allocation span and indicates if the resource block is allocated to the mobile telephone 3. The size of this field is $N_{RB}^{TYPE1} = \lceil N_{RB}^{DL}/P \rceil - \lceil \log_2(P) \rceil - 1$.

As a further solution, it may be possible to define new DCI formats. For example, if a new DCI format is provided for Type 1 allocations, then the size of the Type 1 resource allocation can be changed which allows further options as follows:

Option 3:

This option is similar to Option 1 above, but one additional field is introduced to indicate dynamically (instead of by RRC signalling) either legacy Type 1 or new Type 1 as follows:

The first field with 1-bit is introduced to indicate either legacy Type 1 or new Type 1.

The second field with ceil($\log_2 K$) bits is used to indicate selection of one out of K partitions of the system bandwidth where each bandwidth part contains contiguous RBs with one RB resolution.

The third field includes a bitmap, where each bit of the bitmap addresses a single RB in the selected bandwidth part and indicates if the resource block is allocated to the mobile telephone 3. The size of this field is $N_{RB}^{TYPE1} = \lceil N_{RB}^{DL}/P \rceil - \lceil \log_2(K) \rceil - 1$.

Option 4:

This option is similar to Option 2 above, but instead of reducing the resource allocation span (depending on the number of bits used to identify the start RB), the starting position is signalled dynamically as follows:

The first field with $\lceil \log_2(N_{RB}^{DL}) \rceil$ bits is used to indicate the start RB of the resource allocation anywhere in the system bandwidth.

The second field includes a bitmap, where each bit of the bitmap addresses a single RB in the resource allocation span and indicates if the resource block is allocated to the mobile telephone 3. The size of this field is $N_{RB}^{TYPE1} = \lceil N_{RB}^{DL}/P \rceil$.

The provision of new DCI formats would also allow the supplementary information described above in solution 1 to be included with the allocation information provided by the legacy DCI format. The disadvantage of defining new DCI formats is that it increases the number of blind decoding attempts that each mobile telephone 3 has to perform to find any control data that may be allocated it.

Modifications and Alternatives

A number of embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, a mobile telephone based telecommunication system was described in which the above described resource allocation techniques were employed. As those skilled in the art will appreciate, the techniques for scheduling resources for such communications can be employed in any communication system that uses a plurality of resource blocks. In the general case, the base station would be replaced by a communication node which communicates with a number of different user devices. For example, while the term 'mobile telephone' has been used throughout the description the methods and apparatus described are equally applicable to any communication user device, for example, a personal digital assistant, a laptop computer, a web browser, etc.

In the above embodiments, the base station was assumed to have an operating bandwidth of 20 MHz and each resource block included 12 or 24 sub-carriers. As those skilled in the art will appreciate, the invention is not limited to this particular size of bandwidth or resource block size or to the frequency spacing of the sub-carriers described.

In some of the above embodiments, the mobile telephones 3 are informed by higher layer signalling or over a broadcast channel of one or more predefined resource block sub-sets that are referenced by the supplementary information to identify the resources containing the ePDCCH. As those skilled in the art will appreciate, as an alternative, this predefined information may be permanently stored within the mobile telephones from the time of their initialisation. However, this is not preferred as ideally the predefined resource block subsets will be different for each base station 5, depending on the prevailing local transmission characteristics within the system bandwidth.

In the above embodiments, a number of software modules were described. As those skilled will appreciate, the software modules may be provided in compiled or un-compiled form and may be supplied to the base station or to the mobile telephone as a signal over a computer network, or on a recording medium such as a CD-ROM or the like. Further, the functionality performed by part or all of this software may be performed using one or more dedicated hardware circuits. However, the use of software modules is preferred as it facilitates the updating of the base station 5 and the mobile telephones 3 in order to update their functionalities. Further, the modules described above may not be defined as separate modules and may instead be built in to the operating system of the base station and/or the mobile telephone.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1 Introduction

In principle, for frequency selective scheduling, UE will be allocated to some of its best resource blocks (RBs) for both PDSCH and ePDCCH based on CSI reported by the UE. This means that the ePDCCH region will be allocated in UE-specific manner at least for localized allocations, resulting in ePDCCH regions for different UEs being reserved in different locations of the system bandwidth. In addition, it has been agreed in RAN1#68 that multiplexing of PDSCH and ePDCCH within a PRB pair is not permitted. So, in order to utilize the resources efficiently, any unused PRBs in the ePDCCH region should be reused for PDSCH transmission.

However, there are issues with the current resource allocation schemes. Firstly, when PDSCH resource allocation Type 0 is applied to the UE and ePDCCH occupies a number of RBs less than the RBG size of the system bandwidth, the remaining RBs not assigned for ePDCCH within that RBG can not be used for PDSCH of the same UE creating holes or fragmented resources in the system.

Secondly, regarding PDSCH resource allocation Type 2, when UE is allocated to contiguous RBs and ePDCCHs for both DL and UL grants of the same UE are located within those contiguous RBs (i.e. PDSCH overlaps with actual ePDCCH resources) and if UE fails to detect the UL grant, it will result in UE unable to decode PDSCH as well as corrupting the DL HARQ buffer.

Thirdly, if resource allocation Type 1 is employed to fill the holes created by ePDCCHs of different UEs, it can not handle the fragmented resources because it can only assign PDSCH to a subset of distributed RBGs which adds unnecessary scheduling restrictions to the system, especially for frequency selective scheduling.

These issues have been discussed also in some other contributions in RAN1#69 [2-4].

Further more, we think that the issues discussed above of resource fragmentation and how to reuse the unused PRB pairs in the ePDCCH region are mainly associated with the following cases for ePDCCH PRB-pairs indications:

Dynamic ePDCCH PRB-pairs indication with implicit signaling based on CSI reports: As each UE's best sub-bands for ePDCCH allocation may locate in different sub-bands in the system bandwidth, it will create fragmented resources and prevents large allocations for the PDSCH transmission.

RRC signaling for ePDCCH PRB-pairs indication: If ePDCCH region is distributed in the system bandwidth, it will also create fragmented resources in the system and prevents large allocations for the PDSCH transmission.

In other cases where explicit and dynamic ePDCCH PRB indication solution is adopted for Rel-11 such as signalling through PDCCH or ePCFICH, the above discussed issues do no happen. Because in every subframe, eNB can schedule PDSCH on any PRB-pairs except for the ones used for ePDCCH transmission using existing resources allocation types and as UE knows the PRB-pairs that are currently used for ePDCCH transmission, it can skip them when decoding PDSCH.

The details of the cases a), b), and other cases are described in our accompanying contribution[5].

Therefore, in this contribution, we provide some solutions how to provide more flexibility for the eNB scheduler in terms of resource allocation schemes so that fragmented resources and any unused ePDCCH resources can be efficiently utilised for the same UE or different UEs for the cases of dynamic ePDCCH PRB-pairs indication with implicit signaling based on CSI reports and RRC signaling for ePDCCH PRB-pairs indication.

2 Enhanced PDSCH Resource Allocation Type 0 and 2

Figure 11:
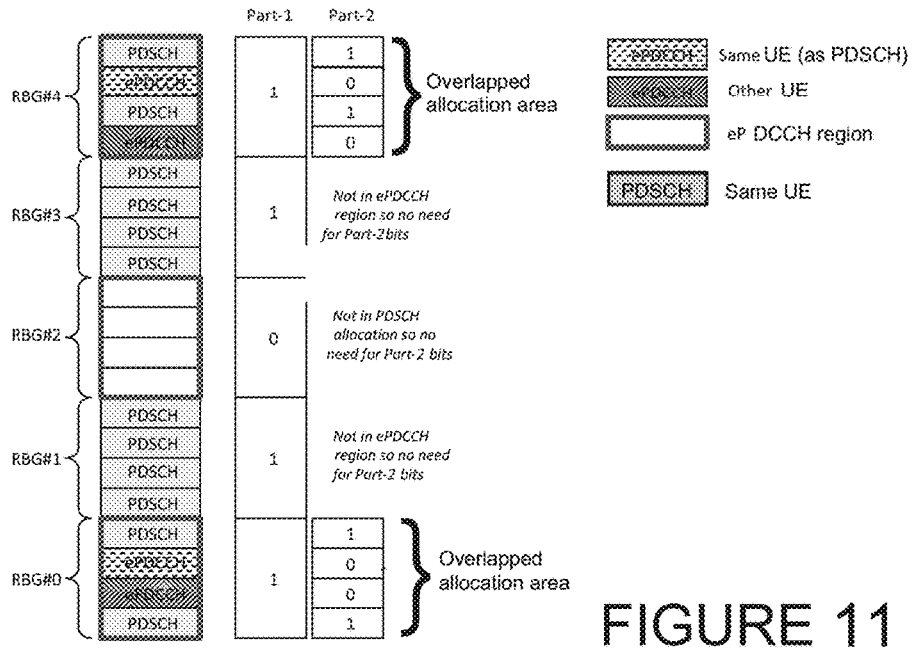
FIG. 11 illustrates an example of enhanced PDSCH resource allocation Type 0.

Enhanced PDSCH Resource Allocation of Type 0:

In legacy PDSCH resource allocation of Type 0, resource block assignment information includes a bitmap indicating the resource block groups (RBGs) that are allocated to the scheduled UE. The RBG is allocated for the UE if the corresponding bit value in the bitmap is 1; the RBG is not allocated to the UE otherwise. However, when Type 0 is utilised for the UE where PDSCH overlaps with ePDCCH, and ePDCCH occupies a number of RBs less than the RBG size of the system bandwidth, the remaining RBs not assigned for ePDCCH within RBG can not be used for PDSCH for the same UE resulting fragmented resources. FIG. 11 shows an example of PDSCH allocation which overlaps with ePDCCH region for the same and other UE. A possible solution to this issue is to enhance PDSCH resource allocation Type 0 where eNB signals supplementary information to the UE to indicate which VRBs should be excluded from the PDSCH resource allocation Type 0 because they contain ePDCCH transmissions. Then, UE combines the supplementary information with its PDSCH resource allocation Type 0 in order to work out its actual resource allocation. In this case, the PDSCH enhanced resource allocation Type 0 consists two parts. Part-1 uses the legacy PDSCH resource allocation Type 0 to indicate discontiguous resource allocation at RBG level. Part-2 contains the supplementary information which is a bit-map of a single VRB in a selected RBG sets. The selected RBG sets of Part-2 are formed by the overlapping RBGs indicated by Part 1 and the RBGs of the ePDCCH region. MSB to LSB of the bitmap of part-2 are mapped to the VRBs in increasing frequency order. The VRB is allocated to the PDSCH for a given UE if the corresponding bit value in the bitmap field is 1; otherwise the VRB is allocated to the ePDCCH for the same UE or different UE. The ePDCCH region is the set of PRB pairs in which ePDCCH may be transmitted and can be configured dynamically or semi-statically for the UE.

Figure 12:
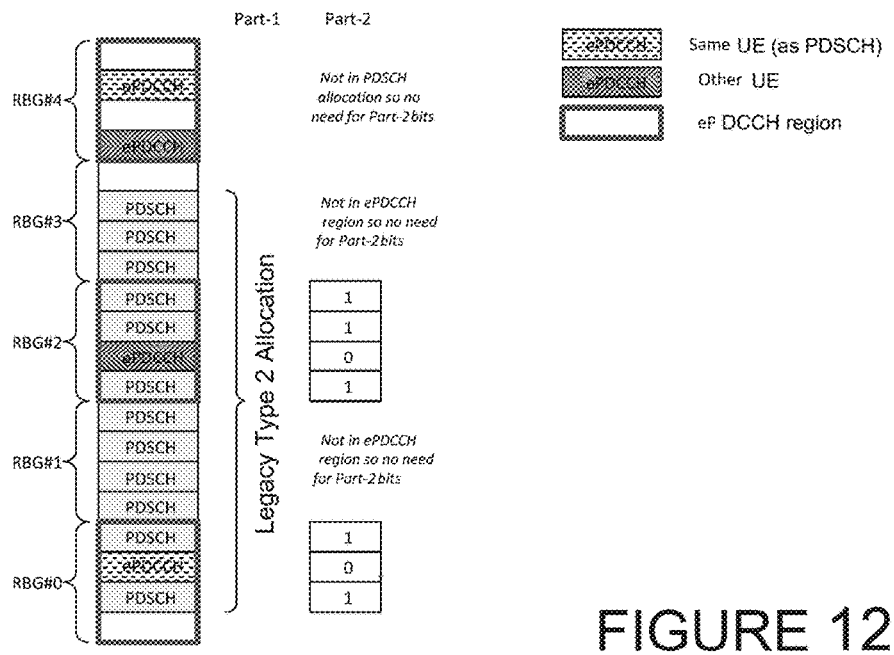
FIG. 12 illustrates an example of enhanced PDSCH resource allocation Type 2.

Enhanced PDSCH Resource Allocation of Type 2:

Legacy PDSCH resource allocation Type 2 field consists of a resource indication value (RIV) corresponding to a starting resource block ($RB_{start}$) and a length in terms of contiguously allocated resource blocks $L_{CRBs}$. However, there is an issue for PDSCH resource allocation Type 2 when UE is allocated for contiguous VRBs and ePDCCHs for both DL and UL grants for the same UE are assigned within those contiguous VRBs and if UE can not detect the UL grant it will result UE not able to decode PDSCH as well as corrupting the DL HARQ buffer. A similar solution to Type 0 can be envisioned where eNB signals supplementary information to the UE to indicate which VRBs should be excluded from the PDSCH resource allocation Type 2 because they contain ePDCCH transmissions. Then, UE combines the supplementary information with its PDSCH resource allocation Type 2 in order to work out its actual resource allocation. The enhanced PDSCH resource allocation Type 2 has two parts. Part-1 uses the legacy resource allocation Type 2 and Part-2 contains the supplementary information which is selected RBG sets where ePDCCH region overlaps with PDSCH indicated by Part 1. An example of this method is shown in FIG. 12. Part-2 is a bit-map scheme of the selected RBG sets where each bit of the bitmap indicates a single VRB in the selected RBG sets in such a way that MSB to LSB of the bitmap are mapped to the VRBs in increasing frequency order. The VRB is allocated to the PDSCH for a given UE if the corresponding bit value in the bitmap field is 1; otherwise the VRB is allocated to the ePDCCH for the same UE or different UE. The ePDCCH region is the set of PRB pairs in which ePDCCH may be transmitted and can be configured dynamically or semi-statically for the UE.

Location of the Supplementary Information (i.e. Part-2) and Number of Bits:

There are different options how to signal Part-2 to the UE as follows:

Option-1: ePDCCH DCI formats: For both Type 0 and 2, Part-2 can be placed in the DCI format as a part of the resource allocation scheme in a UE specific manner when ePDCCH is configured. The number of bits should be less than or equal to the size of ePDCCH region in terms of number of VRBs. For example Part-2 bits for 10 MHz bandwidth can be one of {2 bits, 4 bits, 8 bits}. If the number of supplementary information bits is equal to the number of VRBs in the ePDCCH region, any PDSCH resource allocation is possible without any scheduling restrictions. However, if the number of supplementary information bits is less than the number of VRBs in the ePDCCH region, the scheduler has to make some restrictions on the PDSCH allocation so that the overlap between the PDSCH resources and the ePDCCH region is limited to the number of supplementary information bits supported by the system bandwidth.

Option 2: ePCFICH or new DCI format: Part-2 can be signaled dynamically in the ePCFICH if it is agreed or in a new DCI format and it is common to all UEs or group of UEs. The supplementary information (Part-2) will indicate dynamically the actual occupied VRBs by the ePDCCHs for all UEs from the set of VRBs pre-allocated for the ePDCCH region. In this case, the size of Part-2 bits will be equal to the size of ePDCCH region in terms of number VRBs, e.g. {8 bits, 12 bits, 16 bits}. The ePDCCH region is reserved in advance to the UEs via RRC signalling (i.e. semi-static).

3 Enhanced Resource Allocation Type 1

Figure 13A:
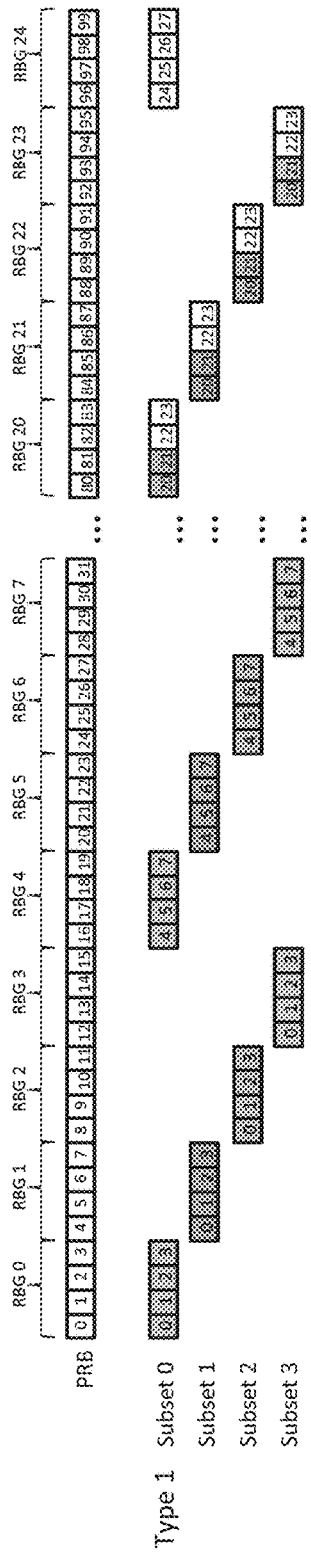
FIGS. 13a and 13b illustrate Legacy PDSCH resource allocation Type 1 in 20 MHz bandwidth.
Figure 13B:
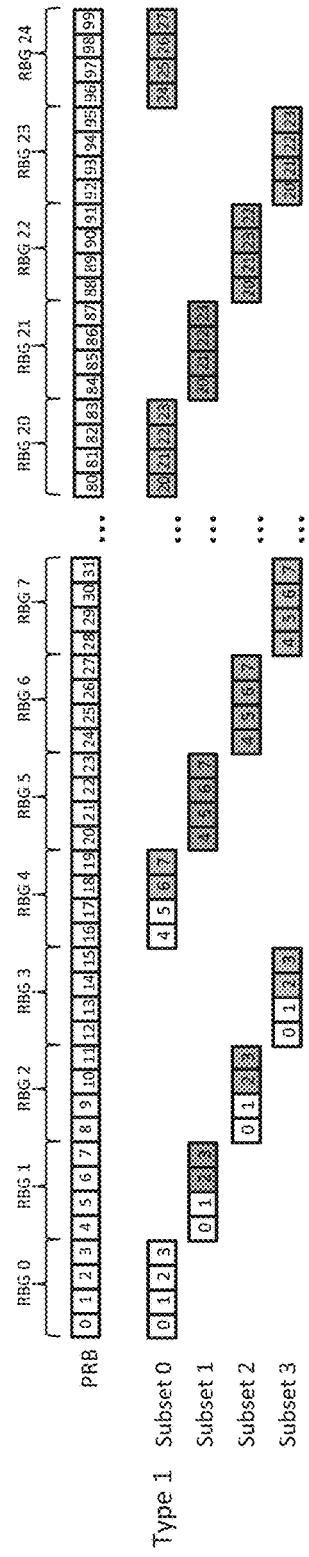

Legacy PDSCH Resource Allocation Type 1:

The legacy PDSCH resource allocation Type 1 applies one bit for one VRB in which the applicable VRBs are subsets of RBGs selected from the system bandwidth in distributed manner (i.e. sub-sampling of the RBGs in the system bandwidth) as shown in FIG. 13a or 13b. PDSCH resource allocation Type 1 can not handle contiguous VRBs of more than one RBG (i.e. it can only handle distributed VRBs to achieve frequency diversity gain), hence, its application for frequency selective scheduling is very limited. In detail as shown on FIGS. 13a and 13b respectively, PDSCH resource allocation Type 1 has the following fields [1]:

The first field with ceil($\log_2$ P) bits is used to indicate the selected RBG subset among RBG subsets.

The second field with one bit is used to indicate a shift of the resource allocation span within a subset. A bit value of 1 indicates shift is triggered to the right (Right justified). Otherwise shift is triggered to the left (Left justified).

The third field includes a bitmap, where each bit of the bitmap addresses a single VRB in the selected RBG subset. The size of this field is $N_{RB}^{TYPE1} = \lceil N_{RB}^{DL}/P \rceil - \lceil \log_2(P) \rceil - 1$.

Enhanced PDSCH Resource Allocation Type 1:

One possible way of overcoming the issue of resource fragmentation as a result of allocating PDSCH around the ePDCCH channel for any UE is to have a finer VRB granularity of resource allocation mechanism (i.e. one VRB resolution) that can handle both contiguous and non-contiguous resource allocations, and applicable to frequency selective scheduling. This can be implemented by modifying the PDSCH resource allocation Type 1 to cover contiguous VRB-level resolution without changing the size of the information bit from that of legacy PDSCH resource allocation Type 1 as follows:

Default: Distributed subset RBG (i.e. sub-sampling) same as current legacy PDSCH resource allocation Type Type 1 intended to achieve frequency diversity gain, for example, for high mobility UEs or cell edge UEs.

Figure 14:
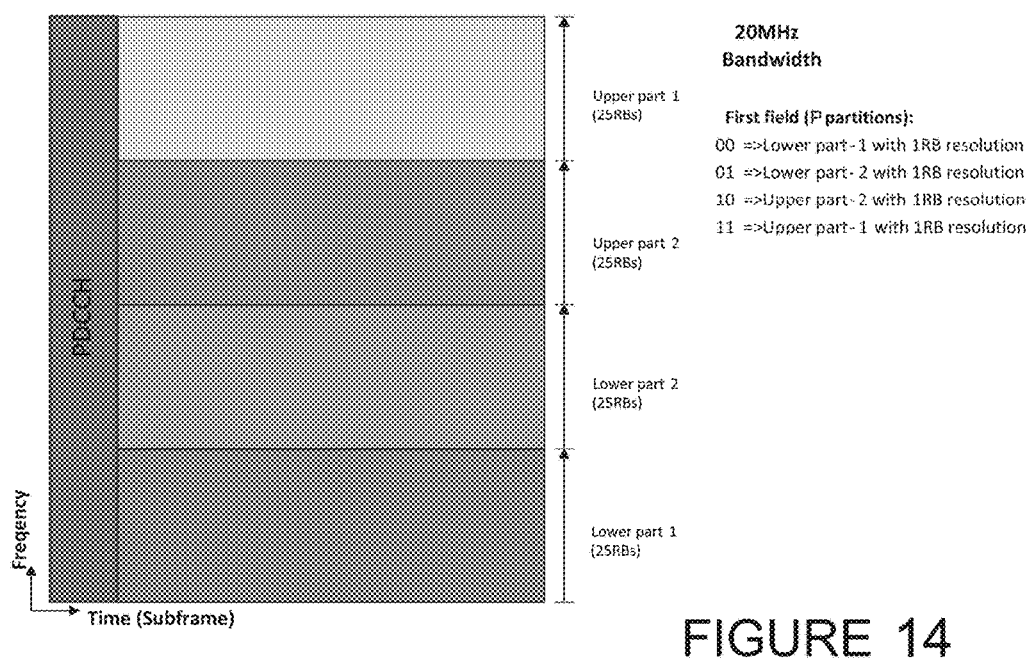
FIG. 14 illustrates an example of enhanced resource allocation Type 1 in 20 MHz BW with four partitions.

RRC signaling in semi-static manner to change the default allocation to cover contiguous resources with one VRB resolution as shown on FIG. 14. The purpose is to achieve frequency selective scheduling and also tackle the issue of resource fragmentation. The existing fields of legacy Type 1 could be reused differently as follows:

The first field with ceil($\log_2$ P) bits is used to indicate a selection of one out of P partitions of the system bandwidth where each bandwidth part contains contiguous RBs with one RB resolution.

The second field with one bit is used to indicate a shift of the resource allocation span within the selected bandwidth partition. A bit value of 1 indicates shift is triggered to the right (Right justified), otherwise shift is triggered to the left (Left justified).

The third field includes a bitmap, where each bit of the bitmap addresses a single VRB in the selected bandwidth part. The size of this field is $N_{RB}^{TYPE1} = \lceil N_{RB}^{DL}/P \rceil - \lceil \log_2(P) \rceil - 1$.

4 Conclusion

In this contribution, we have discussed solutions to provide more flexibility for the eNB scheduler in terms of resource allocation schemes so that fragmented resources can be efficiently utilized for the same UE or different UEs.

Proposal:

Consider enhanced PDSCH resource allocation schemes for Release-11 to deal with the issue of fragmented resources if the following cases are agreed for ePDCCH PRB-pairs indication:

a) Dynamic ePDCCH PRB-pairs indication with implicit signaling based on CSI reports b) RRC signaling for ePDCCH PRB-pairs indication Various other modifications will be apparent to those skilled in the art and will not be described in further detail here.

This application is based upon and claims the benefit of priority from United Kingdom patent application No. 1213794.9, filed on Aug. 2, 2012, the disclosure of which is incorporated herein in its entirety by reference.

What is claimed is:

1. A method performed by a base station, the method comprising:

generating control information comprising a first element, a second element and a third element for controlling communications with a mobile telephone in accordance with the generated control information;

transmitting the generated control information to the mobile telephone;

indicating, to the mobile telephone, using the first element of the control information, whether the control information is a legacy type or a new type;

indicating, to the mobile telephone, using the second element of the control information, a partition of a system bandwidth that is allocated for communications between the base station and the mobile telephone; and indicating, to the mobile telephone, using the third element of the control information, at least one resource block within the indicated partition of the system bandwidth that is allocated for communications between the base station and the mobile telephone.

2. A base station for communicating with a mobile telephone, the base station comprising:

a controller configured to generate control information comprising a first element, a second element and a third element for controlling communications with the mobile telephone in accordance with the generated control information; and a transceiver circuit configured to transmit the generated control information to the mobile telephone;

wherein the controller is configured to indicate, to the mobile telephone, using the first element of the control information, whether the control information is a legacy type or a new type;

wherein the controller is configured to indicate, to the mobile telephone, using the second element of the control information, a partition of a system bandwidth that is allocated for communications between the base station and the mobile telephone; and wherein the controller is configured to indicate, to the mobile telephone, using the third element of the control information, at least one resource block within the indicated partition of the system bandwidth that is allocated for communications between the base station and the mobile telephone.

3. The base station according to claim 2, wherein the second element comprises an index having a number of bits given by the formula ceil($\log_2(K)$), where K is a total number of partitions of the system bandwidth.

4. The base station according to claim 2, wherein the third element comprises one of: a type 0 resource allocation; a type 1 resource allocation; and a type 2 resource allocation.

5. The base station according to claim 2, wherein the third element comprises one of: a bitmap and an index of a predefined resource block subset.

6. A mobile telephone for communicating with a base station, the mobile telephone comprising:
   a controller; and
   a transceiver circuit configured to receive, from the base station, control information comprising a first element, a second element and a third element for controlling communications with the base station in accordance with the generated control information;
   wherein the controller is configured to determine, using the first element of the received control information, whether the control information is a legacy type or a new type;
   wherein the controller is configured to determine, using the second element of the received control information, a partition of a system bandwidth that is allocated for communications between the base station and the mobile telephone; and
   wherein the controller is configured to determine, using the third element of the received control information, at least one resource block within the indicated partition of the system bandwidth that is allocated for communications between the base station and the mobile telephone.

7. The mobile telephone according to claim 6, wherein the second element comprises an index having a number of bits given by the formula $\operatorname{ceil}(\log_2(K))$, where K is a total number of partitions of the system bandwidth.

8. The mobile telephone according to claim 6, wherein the third element comprises one of: a type 0 resource allocation; a type 1 resource allocation; and a type 2 resource allocation.

9. The mobile telephone according to claim 6, wherein the third element comprises one of: a bitmap; and an index of a predefined resource block subset.

10. A method performed by a mobile telephone, the method comprising:
    receiving, from the base station, control information comprising a first element, a second element and a third element for controlling communications with the base station in accordance with the generated control information;
    determining, using the first element of the received control information, whether the control information is a legacy type or a new type;
    determining, using the second element of the received control information, a partition of a system bandwidth that is allocated for communications between the base station and the mobile telephone;
    determining, using the third element of the received control information, at least one resource block within the indicated partition of the system bandwidth that is allocated for communications between the base station and the mobile telephone; and
    controlling communications with the base station in accordance with the received control information.

11. A non-transitory computer-readable medium comprising computer implementable instructions for causing, when run on a programmable communication device, the programmable communication device to become configured as a base station according to claim 2.

12. A non-transitory computer-readable medium comprising computer implementable instructions for causing, when run on a programmable communication device, the programmable communication device to become configured as a mobile telephone according to claim 6.

* * * * *